(12) United States Patent
Kim et al.

(10) Patent No.: US 12,438,210 B2
(45) Date of Patent: Oct. 7, 2025

(54) APPARATUS FOR RECOVERING ACTIVE MATERIAL AND METHOD FOR REUSING ACTIVE MATERIAL BY USING SAME

(71) Applicant: LG ENERGY SOLUTION, LTD., Seoul (KR)

(72) Inventors: Min-Seo Kim, Daejeon (KR); Se-Ho Park, Daejeon (KR); Doo-Kyung Yang, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 576 days.

(21) Appl. No.: 17/912,017

(22) PCT Filed: Jul. 1, 2021

(86) PCT No.: PCT/KR2021/008377
§ 371 (c)(1),
(2) Date: Sep. 15, 2022

(87) PCT Pub. No.: WO2022/035053
PCT Pub. Date: Feb. 17, 2022

(65) Prior Publication Data
US 2023/0139010 A1    May 4, 2023

(30) Foreign Application Priority Data
Aug. 13, 2020    (KR) .................. 10-2020-0101962

(51) Int. Cl.
*H01M 10/54*    (2006.01)
*C22B 1/02*    (2006.01)
(Continued)

(52) U.S. Cl.
CPC ............ *H01M 10/54* (2013.01); *C22B 1/02* (2013.01); *C22B 7/001* (2013.01); *C22B 7/008* (2013.01); *C22B 26/12* (2013.01)

(58) Field of Classification Search
None
See application file for complete search history.

(56) References Cited

U.S. PATENT DOCUMENTS 6,228,143 B1 *    5/2001    Aiken .................. F23G 7/003
                                                          429/49
8,616,475 B1 *    12/2013    Smith ................. H01M 10/54
                                                          241/23
(Continued)

FOREIGN PATENT DOCUMENTS

CN    107994286 A    5/2018
CN    108598382 A    9/2018
(Continued)

OTHER PUBLICATIONS

English machine translation of KR20180042641A. (Year: 2018).*
(Continued)

*Primary Examiner* — Kevin M Bernatz
(74) *Attorney, Agent, or Firm* — Bryan Cave Leighton Paisner LLP

(57) ABSTRACT

An active material recovery apparatus capable of easily recovering an electrode active material from an electrode scrap in its intrinsic shape and a positive electrode active material reuse method using the active material recovery apparatus are provided. The active material recovery apparatus which is a rotary firing apparatus comprising a rod in a screw type therein includes a heat treatment bath and a screening wall arranged in a line along an axis of the rod, wherein the heat treatment bath constitutes a heating zone, and the screening wall constitutes a cooling zone; and an exhaust injection and degassing system, wherein the heat treatment bath removes a binder and a conductive material in an active material layer by performing heat treatment on an electrode scrap comprising the active material layer on a current collector in an air while rotating the electrode scrap (Continued)

around the axis of the rod and separates the current collector from the active material layer, and an active material in the active material layer passes through the screening wall and is recovered as an active material in powder form, and the current collector that does not pass through the screening wall is recovered separately.

15 Claims, 18 Drawing Sheets

(51) Int. Cl.
*C22B 7/00* (2006.01)
*C22B 26/12* (2006.01)

(56) References Cited

U.S. PATENT DOCUMENTS

| | | | |
|---|---|---|---|
| 2018/0013181 A1* | 1/2018 | Ho | H01M 6/52 |
| 2018/0040896 A1 | 2/2018 | Choi et al. | |
| 2022/0336878 A1* | 10/2022 | Park | C01G 51/42 |
| 2022/0336879 A1* | 10/2022 | Park | H01M 4/13 |
| 2023/0041348 A1* | 2/2023 | Kim | C22B 7/001 |
| 2023/0045467 A1* | 2/2023 | Park | C22B 7/00 |
| 2023/0051670 A1* | 2/2023 | Kim | C01G 53/50 |
| 2023/0062492 A1* | 3/2023 | Kim | C01G 53/42 |
| 2023/0063543 A1* | 3/2023 | Kim | H01M 4/0471 |
| 2023/0082541 A1* | 3/2023 | Kim | C22B 7/001 427/122 |
| 2023/0183836 A1* | 6/2023 | Kim | C22B 7/001 423/179.5 |
| 2023/0327226 A1* | 10/2023 | Kim | H01M 4/485 429/49 |
| 2024/0039070 A1* | 2/2024 | Park | H01M 4/525 |
| 2024/0055597 A1* | 2/2024 | Lee | H01M 4/525 |
| 2024/0120566 A1* | 4/2024 | Kim | H01M 4/525 |
| 2025/0030076 A1* | 1/2025 | Choi | H01M 4/02 |
| 2025/0033993 A1* | 1/2025 | Seo | H01M 10/052 |
| 2025/0038288 A1* | 1/2025 | Yu | C22B 1/005 |

FOREIGN PATENT DOCUMENTS

| | | |
|---|---|---|
| CN | 111153397 A | 5/2020 |
| DE | 699448 C | 11/1940 |
| JP | 2004-349210 A | 12/2004 |
| JP | 2010-231925 A | 10/2010 |
| JP | 2013-143358 A | 7/2013 |
| JP | 2019-108585 A | 7/2019 |
| KR | 10-11974390000 B1 | 10/2012 |
| KR | 10-2017-0033787 A | 3/2017 |
| KR | 10-2017-0100861 A | 9/2017 |
| KR | 10-1803859 B1 | 12/2017 |
| KR | 10-2018-0042641 A | 4/2018 |
| KR | 10-19122020000 B1 | 10/2018 |
| KR | 10-2019-0142443 A | 12/2019 |

OTHER PUBLICATIONS

Zhao et al., (2019) "Regeneration and reutilization of cathode materials from spent lithium-ion batteries", Chemical Engineering Journal, vol. 383, pp. 1-19.

Shi et al., (2018) "Effective regeneration of LiCoO2 from spent lithium-ion batteries: a direct approach towards high-performance active particles", Green Chemistry, vol. 20, pp. 851-862.

Zuo et al., (2017) "Recent progress in surface coating of cathode materials for lithium ion secondary batteries", Journal of Alloys and Compounds, vol. 706, pp. 24-40.

* cited by examiner

▨ ELECTRODE SCRAP
▭ CURRENT COLLECTOR AFTER SECESSION OF ELECTRODE
• POSITIVE ELECTRODE ACTIVE MATERIAL

▨ ELECTRODE SCRAP
▢ CURRENT COLLECTOR AFTER SECESSION OF ELECTRODE
● POSITIVE ELECTRODE ACTIVE MATERIAL (a) (b) (c) (d)

(a)

(b)

(c)

(d)

(e)

(f)

(a)

(b)

(c)

(d)

(e)

(f)

APPARATUS FOR RECOVERING ACTIVE MATERIAL AND METHOD FOR REUSING ACTIVE MATERIAL BY USING SAME

CROSS-REFERENCE TO RELATED APPLICATIONS

The present application is a National Phase entry pursuant to 35 U.S.C. § 371 of International Application No. PCT/KR2021/008377, filed on Jul. 1, 2021, and claims the benefit of and priority to Korean Patent Application No. 10-2020-0101962, filed on Aug. 13, 2020 with the Korean Intellectual Property Office, the disclosures of which are incorporated herein by reference in their entirety for all purposes as if fully set forth herein.

TECHNICAL FIELD

The present disclosure relates to a method of recycling resources when manufacturing a lithium secondary battery. In particular, the present disclosure relates to an apparatus for recovering an electrode active material from an electrode scrap generated in a lithium secondary battery manufacturing process or from a lithium secondary battery that is discarded after use, and a method of reusing the recovered active material.

BACKGROUND

Lithium secondary batteries which may be repeatedly charged and discharged are in the spotlight as an alternative to fossil energy. Lithium secondary batteries have been mainly used in traditional handheld devices such as cell phones, video cameras, and power tools. However, recently, application fields of lithium secondary batteries have been gradually increasing to electric vehicles (EVs, HEVs, and PHEVs), large capacity energy storage systems (ESSs), uninterruptible power supply systems (UPS), etc.

A lithium secondary battery includes an electrode assembly in which unit cells having a structure in which a positive electrode plate and a negative electrode plate coated with an active material on a current collector are arranged with a separator interposed therebetween, and an exterior material sealing and accommodating the electrode assembly together with an electrolyte, that is, a battery case. The positive electrode active material of the lithium secondary battery mainly uses a lithium-based oxide, and the negative electrode active material uses a carbon material. The lithium-based oxide contains a metal such as cobalt, nickel, or manganese. In particular, cobalt, nickel, and manganese are very expensive valuable metals. Among these, cobalt is a strategic metal, and each country in the world has a special interest in supply and demand of cobalt. Since the number of cobalt producing countries is limited, it is known as a metal whose supply and demand is unstable worldwide. If an imbalance in the supply and demand of raw materials of strategic metals occurs, raw material prices are highly likely to rise.

Conventionally, research on recovering and recycling these valuable metals from lithium secondary batteries (waste batteries) which are discarded when their lifespan is completed after use has been mainly conducted. In addition to waste batteries, it is more preferable if resources may be recovered from wastes discarded after the positive electrode plate is punched or from the positive electrode in which a defect occurs during the process.

Currently, when manufacturing a lithium secondary battery, as shown in FIG. 1, a positive electrode sheet 30 is manufactured by forming a positive electrode active material layer 20 in which a long sheet type positive electrode current collector 10 such as aluminum (Al) foil is coated with a positive electrode slurry in which a positive electrode active material, a conductive material, a binder, a solvent, etc. are mixed, and then a positive electrode plate 40 is punched out with a certain size. A part remaining after punching is discarded as a positive electrode scrap 50. If it is possible to recover the positive electrode active material from the positive electrode scrap 50 and reuse the positive electrode active material, it would be very desirable from an industrial-economic point of view and an environmental point of view.

Conventionally, in most cases, a method of recovering the positive active material is performed by dissolving a positive electrode in hydrochloric acid, sulfuric acid, nitric acid, etc., and then extracting an active material element such as cobalt, nickel, manganese, etc., and the extracted active material element is reused as a raw material for the synthesis of the positive active material. However, the method of extracting the active material element using an acid has disadvantages in that a process of recovering pure raw materials is not environmentally friendly as well as requires a neutralization process and a wastewater treatment process, which increases the process cost. In addition, the method has a disadvantage in that lithium, which is one of the main elements of the positive electrode active material, may not be recovered. In order to solve these disadvantages, a method of directly reusing the active material without dissolving the positive electrode active material and extracting the active material in element form is required.

The background description provided herein is for the purpose of generally presenting context of the disclosure. Unless otherwise indicated herein, the materials described in this section are not prior art to the claims in this application and are not admitted to be prior art, or suggestions of the prior art, by inclusion in this section.

DISCLOSURE

Technical Problem

The present disclosure is directed to providing an active material recovery apparatus capable of easily recovering an electrode active material from an electrode scrap in its intrinsic shape.

The present disclosure is also directed to providing a positive electrode active material reuse method using the active material recovery apparatus.

Technical Solution

In one aspect of the present disclosure, there is provided an active material recovery apparatus which is a rotary firing apparatus having a rod of a screw type therein includes a heat treatment bath and a screening wall arranged in a line along an axis of the rod, wherein the heat treatment bath constitutes a heating zone, and the screening wall constitutes a cooling zone; and an exhaust injection and degassing system, wherein the heat treatment bath is configured to remove a binder and a conductive material from an active material layer by performing heat treatment in air on an electrode scrap comprising the active material layer on a current collector while rotating the electrode scrap around the axis of the rod, and separate the current collector from the active material layer, and wherein an active material in the active material layer passes through the screening wall and is recovered as the active material in powder form, and the current collector that does not pass through the screening wall is recovered separately.

The heat treatment bath may also rotate around the axis of the rod.

An angle of the entire active material recovery apparatus may be adjusted so that the axis is inclined with respect to a ground.

The active material recovery apparatus may have a vibration function.

The active material recovery apparatus may be a continuous type so that input of a new electrode scrap and recovery of the active material may be continuously performed.

Preferably, the heat treatment bath may have a tubular shape with both ends open so that the electrode scrap may be put therein and the separated current collector and active material may be transferred to the screening wall, and the heat treatment bath may be an open type system through which air enters and exits.

Preferably, the screening wall may have a tubular shape with both ends open so that the separated current collector and active material are put therein and the current collector is discharged.

The heat treatment bath is preferably an open type system in which air of 10 mL/min to 100 L/min is added or injected per 100 g of the electrode scrap that is put in.

Air inlets may be preferably formed in a plurality of places in the heat treatment bath.

In one aspect of the present disclosure, there is provided a method of reusing a positive electrode active material including providing the active material recovery apparatus according to the present disclosure; feeding a positive electrode scrap into a heat treatment bath comprising an active material layer on a current collector; removing a binder and a conductive material from the active material layer by performing heat treatment in air on the positive electrode scrap while rotating the positive electrode scrap around an axis of a rod in the heat treatment bath and separating the current collector from the active material layer; recovering an active material in powder form that has passed through the screening wall; and annealing the active material in the air at 400 to 1000° C. to obtain a reusable active material.

At this time, the heat treatment may be performed at 300 to 650° C. Heat treatment may be performed at 550° C. as a temperature increase rate of 5° C./min for 30 minutes.

A carbon component generated by carbonization of the binder or the conductive material may not remain on a surface of the recovered active material.

The method may further include, before the annealing step, washing the recovered active material with a lithium compound solution showing basicity in an aqueous solution state. In that case, before the annealing step and after the washing step, a lithium precursor may be preferably added to the washed active material. The lithium compound aqueous solution may be prepared to contain a lithium compound more than 0% and equal to or less than 15%, and preferably uses LiOH. The washing may be performed within one hour. The washing may be performed by impregnating the recovered active material in the lithium compound aqueous solution and at the same time stirring the recovered active material.

For another example, the method of reusing a positive electrode active material may further include, after the washing step, obtaining the active material to which a lithium precursor is added and of which particles are adjusted, by mixing the washed active material with a lithium precursor solution and spray drying the active material.

The method may further include performing surface coating on the annealed active material.

The lithium precursor used in the annealing step may include at least one of LiOH, $Li_2CO_3$, $LiNO_3$ and $Li_2O$.

The lithium precursor may be added by an amount that may be added as much as a ratio of lithium lost compared to a ratio of lithium to other metals in a raw material active material used in the active material layer. For example, the lithium precursor may be added by an amount of lithium added at a molar ratio of 0.001 to 0.4. Furthermore, the lithium precursor may be added by an amount of lithium that may be further added at a molar ratio of 0.0001 to 0.1 with respect to 1:1 that is a molar ratio of lithium to other metals. A temperature of the annealing may exceed a melting point of the lithium precursor.

The performing of the surface coating may include coating at least one of a metal, an organic metal and a carbon component on a surface in a solid or liquid method and then performing heat treatment at 100 to 1200° C.

The reusable active material is represented by Chemical Formula 1 below,

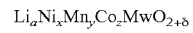

(in Chemical Formula 1 above, M includes at least one selected from the group consisting of B, W, Al, Ti and Mg, $1<a\leq1.1$, $0\leq x\leq0.95$, $0\leq y\leq0.8$, $0\leq z\leq1.0$, $0\leq w\leq0.1$, $-0.02\leq\delta\leq0.02$, and $x+y+z+w=1$.)

The reusable active material may include content of fluorine (F) equal to or less than 100 ppm.

Advantageous Effects

According to the present disclosure, it is possible to provide an active material recovery apparatus capable of easily seceding an electrode active material from a current collector during heat treatment by increasing an air contact rate through introduction of a rotary heat treatment bath and continuously separating the electrode active material from the current collector.

Using the active material recovery apparatus according to the present disclosure, it is possible to recover the positive electrode active material from the positive electrode scrap. This method may reuse a waste positive electrode active material such as a positive electrode scrap generated during a manufacturing process of a lithium secondary battery without using an acid, and thus the method is eco-friendly. The method according to the present disclosure does not require a neutralization process or a wastewater treatment process, thereby relaxing environmental issues and reducing process costs.

According to the present disclosure, the positive electrode active material may be recovered without an unrecoverable metal element. Since a current collector is not dissolved, the current collector may also be recovered. The method may directly reuse the active material recovered in powder form, rather than extracting an active material element and using the active material element as a raw material for synthesizing a positive electrode active material again, and thus the method is economical.

According to the present disclosure, toxic and explosive solvents such as NMP, DMC, acetone, and methanol are not used, and thus the method is safe. Simple processes such as heat treatment, washing, and annealing, etc., are used, and thus it is easy to manage the processes and the method is suitable for mass production.

According to the present disclosure, the electrochemical performance of the recovered active material does not deteriorate, and excellent resistance and capacity properties may be implemented.

BRIEF DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

DETAILED DESCRIPTION

Figure 1:
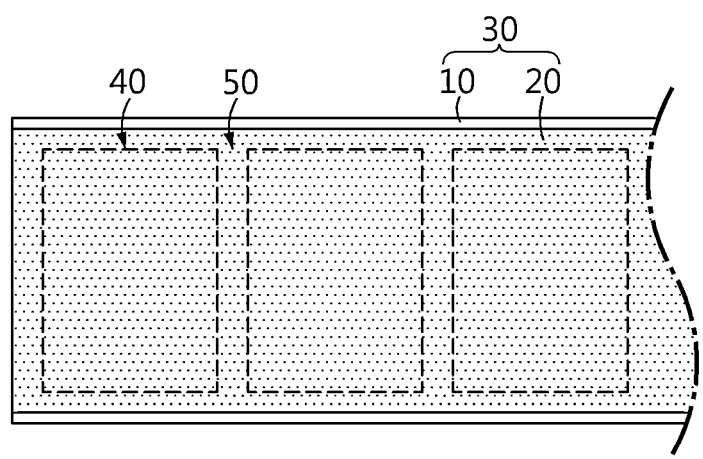
FIG. 1 is a diagram showing a positive electrode scrap discarded after a positive electrode plate is punched from a positive electrode sheet.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

In the following description, reference is made to the accompanying drawings, which form a part hereof. The illustrative embodiments described in the detailed description, drawings, and claims are not meant to be limiting. Other embodiments may be utilized, and other changes may be made, without departing from the sprit and scope of the subject matter presented herein. It will be readily understood that the aspects of the present disclosure, as generally described herein, and illustrated in the drawings, may be arranged, substituted, combined, separated, and designed in a wide variety of different configurations, all of which are explicitly contemplated herein.

Unless defined otherwise, all technical and scientific terms used herein generally have the same meaning as commonly understood by one of ordinary skill in the art to which the disclosure belongs.

The present disclosure is not to be limited in terms of the particular embodiments described in this application, which are intended as illustrations of various aspects. Many modifications and variations can be made without departing from its spirit and scope, as will be apparent to one of ordinary skill in the art. Functionally equivalent methods and apparatuses within the scope of the disclosure, in addition to those enumerated herein, will be apparent to one of ordinary skill in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only, and is not intended to be limiting.

In the case of the conventional active material recycling process, the main purpose was to extract valuable metals (nickel, cobalt, manganese, etc.) as elements in the lithium secondary battery active material whose performance has deteriorated after use and resynthesize the active material, whereas, there is a difference in that the present disclosure recovers the active material from a positive electrode scrap generated during a lithium secondary battery manufacturing process.

Furthermore, in the case of the already known active material recycling process, a chemical method of extracting a valuable metal through acid/base dissolution or melting using reduction/additive, and manufacturing the valuable metal as a metal (a direct reduction method) or a resynthesized active material is added, which additionally incurs the complexity of process and the economic cost. However, the present disclosure relates to a method of directly reusing a positive electrode active material without dissolving the positive electrode active material.

In order to directly reuse the positive electrode active material, a method of removing a current collector from a positive electrode is required. To remove the current collector from the positive electrode, it is possible to remove a binder through high temperature heat treatment, to melt the binder using a solvent, to completely melt the current collector, to select the active material through dry grinding and sieving, etc.

The stability of the solvent is important in dissolving the binder using the solvent. Although NMP is the most efficient solvent, NMP has the disadvantages of toxicity and high price. In addition, there is a disadvantage that a solvent recovery process such as reprocessing a waste solvent is required. Melting the current collector may be cheaper than using the solvent. However, since it is difficult to remove foreign substances from the surface of the reuse active material and hydrogen gas is generated during a current collector removal process, there is a risk of explosion. It is difficult to completely separate the current collector and the active material by dry grinding and sieving. Since the particle size distribution of active materials is changed during a grinding process, and it is difficult to remove the binder, there is a disadvantage in that the properties of a reused battery deteriorate.

In the present disclosure, the active material and the current collector are separated by high temperature heat treatment. In particular, an apparatus that performs heat treatment in the air and is advantageous for mass production and commercialization is provided. Foreign substances should not remain on the surface of the reuse active material. In the present disclosure, even a step of removing foreign substances from the surface of the reuse active material is proposed.

Hereinafter, an active material recovery apparatus according to embodiments of the present disclosure is described with reference to FIGS. 2 and 3.

Figure 2:
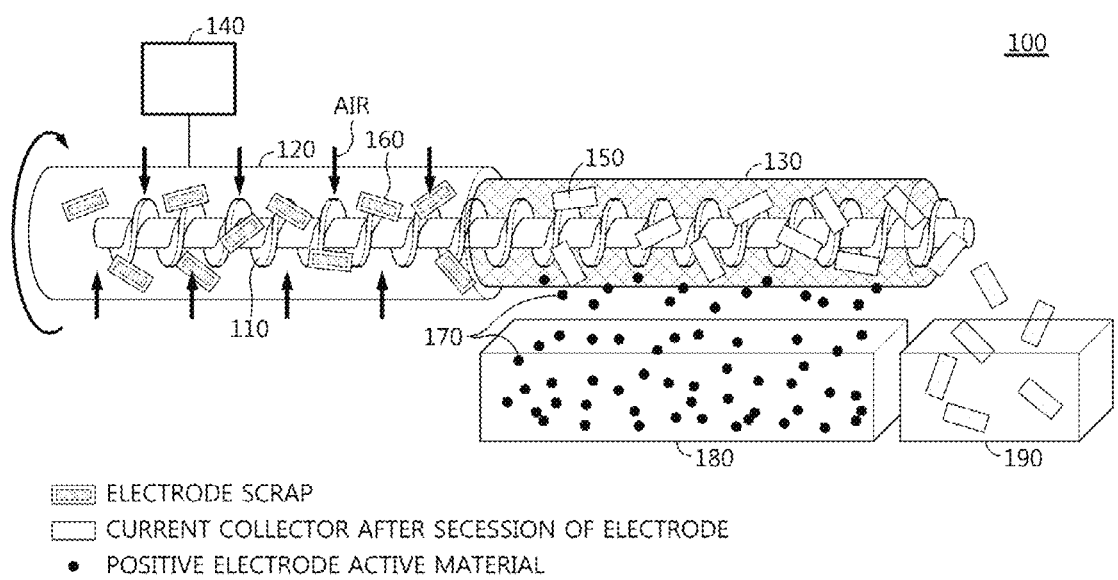
FIG. 2 is a schematic diagram of an active material recovery apparatus according to an embodiment of the present disclosure.

First, an active material recovery apparatus 100 shown in FIG. 2 is a rotary firing apparatus including a rod 110 in a screw type therein.

A heat treatment bath 120 and a screening wall 130 are arranged in a line along an axis of the rod 110. The heat treatment bath 120 and the screening wall 130 may have a hollow tubular shape having a certain space in which an object to be treated may be contained. At this time, the rod 110 passes through the center of the heat treatment bath 120 and the screening wall 130, the heat treatment bath 120 and the screening wall 130 may be coaxial arrangement. The rod 110 may have a long shape so as to be connected from one side to the other side in the longitudinal direction of the heat treatment bath 120 and the screening wall 130.

The heat treatment bath 120 constitutes a heating zone, and the screening wall 130 constitutes a cooling zone. The heat treatment bath 120 is installed at the front end of the apparatus in a transfer direction of the object to be treated, and the screening wall 130 is installed at the rear end of the apparatus. By sequentially installing the heat treatment bath 120 and the screening wall 130, the object to be treated is sufficiently heated in the heat treatment bath 120 to cause thermal decomposition and then transferred to the screening wall 130.

The active material recovery apparatus 100 also includes an exhaust injection and degassing system 140. Air or oxygen may be injected into the heat treatment bath 120 using the exhaust injection and degassing system 140. Exhaust gas after heat treatment may be purified using the exhaust injection and degassing system 140 and then discharged.

The rod 110 rotates along the axis thereof. The object to be treated is an electrode scrap 160, and preferably a positive electrode scrap. The electrode scrap 160 includes an active material layer on a current collector 150. The heat treatment bath 120 removes a binder and a conductive material in the active material layer by performing heat treatment on the electrode scrap 160 in the air while rotating the electrode scrap 160 around the axis of the rod 110. Heat treatment may be performed at 300 to 650° C., and thus may also be called high temperature heat treatment. At a temperature less than 300° C., there is a problem in that it is difficult to remove the binder so that the current collector 150 may not be separated. At a temperature equal to or greater than 650° C., a phenomenon occurs that the current collector 150 melts (Al melting point: 660° C.) and may not be separated. When thermal decomposition occurs sufficiently and the binder is removed, the active material layer may be separated from the current collector 150. The heat treatment bath 120 may also rotate around the axis of the rod 110. At this time, the rotational direction of the heat treatment bath 120 may be the same as or opposite to the rotational direction of the rod 110. The rotational direction of the heat treatment bath 120 may be changed at an appropriate time interval.

The rotation of the rod 110 and/or the heat treatment bath 120 leads to the rotation of the electrode scrap 160. In particular, the rod 110 pushes the electrode scrap 160 while stirring the electrode scrap 160, which helps the electrode scrap 160 to be in good contact with the air and the active material layer to be separated as the active material 170 in powder form by a stirring force. When only the heat treatment bath 120 is rotated, there is a high possibility that the electrode scrap 160 including heavy metal components is not rotated well and is piled up only in the lower part of the inside of the heat treatment bath 120. Then there is less contact of oxygen or air. In the present disclosure, the electrode scrap 160 may be stirred by rotating the rod 110 inside of the heat treatment bath 120. Even if the electrode scrap 160 is not put in by fine shredding, the electrode scrap 160 may be split by the rod 110. The split electrode scrap 160 is rotated by the rod 110 so that the split electrode scrap 160 may sufficiently contact oxygen or air. The rod 110 does not simply rotate but is a screw type, and thus the rod 110 has a protruding structure such as a pin, a wing, or a stick. This protruding structure maximizes the rotation and mixing of the electrode scrap 160. Accordingly, an incomplete combustion due to an overlapping phenomenon between electrode scraps may be eliminated.

The active material layer separated from the current collector 150 through heat treatment in the heat treatment bath 120 may have a structure such as individual particles or flakes in which particles are agglomerated, and since an active material is not in a continuous film state, the active material is referred to as having powder form in the present disclosure. As such, in the heat treatment bath 120, the active material in powder form may be obtained from the current collector 150 by simple heat treatment in the air, and some electrode scraps 160 may be transferred to the screening wall 130 in a state in which the active material layer is attached onto the current collector 150 only by van der Waals force, or some active material layers are detached to become the active material 170 in powder form.

It is preferable that the heat treatment bath 120 has a tubular shape with both ends open so that the electrode scrap 160 is put therein and the current collector 150 from which the binder and the conductive material are removed and the active material 170 are transferred to the screening wall 130. And, it is preferable that a tube is an open type system through which air enters and exits. That is, since the tube does not have a closed structure, oxygen in the outside air may be introduced.

The heat treatment bath 120 includes a container that receives, rotates, and mixes the electrode scrap 160, and a heating unit capable of heat treating the electrode scrap 160 by adding heat to the container. The container may be made of a metal or ceramic material. In particular, if the container is made of the ceramic material, corrosion due to the reaction with the active material may be prevented, and contamination of the active material by metal ions generated from the container may also be prevented. In addition, a heat source such as a microwave may also be used as the heating unit, and thus types of available heat sources are diversified.

For example, the container of the heat treatment bath 120 may be a tube made of a ceramic material, for example, high purity alumina. And since such a tube further includes flanges connecting in the longitudinal direction at both ends of the tube, the heat treatment bath 120 capable of large capacity processing may be manufactured by connecting two or more tubes to each other and extending the length. In general, it is very difficult to manufacture the tube made of the ceramic material over a certain diameter and a certain length due to the characteristics of the material, and the product price of the tube is quite high. Accordingly, a plurality of tubes made of the ceramic material and having suitable diameters and lengths may be connected to a desired length through the flange, and large capacity processing is possible by manufacturing the tubes to a length, for example, equal to or more than hundreds of mm or thousands of mm.

The heating unit may be provided on an outer circumferential surface of the container. For example, the heating unit is a linear heating element, and the heating element has a long bar shape so as to be connected from one side in the longitudinal direction of the container to the other side, and may be disposed on the outer circumferential surface of the container. Then, heat of a uniform temperature may be generated in the longitudinal direction of the container. The heating element may include at least one selected from the group consisting of SiC, graphite, carbon nanotubes, carbon nanofibers, and graphene, and may preferably be formed of a SiC material.

The heat treatment bath 120 is preferably an open type system in which air of 10 mL/min to 100 L/min is added or injected per 100 g of the electrode scrap 160 that is put in. If the heat treatment bath 120 has a tubular shape with both ends open, an addition of air is smooth. In addition, as shown by arrows in FIG. 2, when air inlets are installed in a plurality of places in the heat treatment bath 120, since air or oxygen injected through the exhaust injection and degassing system 140 is smoothly supplied in a part where the electrode scrap 160 is mixed, a sufficient supply of air and oxygen necessary for thermal decomposition into the heat treatment bath 120 is possible. The air inlets may be installed even in the rod 110.

When the electrode scrap 160 is heat treated, PVdF (polyvinylidene fluoride) and a conductive material present in the active material layer are decomposed and seceded from the current collector. However, if sufficient air and oxygen are not supplied, the active material layer is not separated from the current collector due to an incomplete combustion, but rather strongly carbonized and adheres to the current collector. In this case, since a recovery rate of the active material is reduced, it is difficult to secure fairness. The heat treatment bath 120 may control an addition amount of air and has a structure in which the electrode scrap 160 is in good contact with air during heat treatment. In particular, in order to recover a great amount of active material, the rod 110 rotates so that the electrode scrap 160 is in good contact with the air, and the heat treatment bath 120 is also rotated so that the electrode scrap 160 moves around inside of the heat treatment bath 120 to be evenly heated and may be maximally in contact with the air. The incomplete combustion of elements constituting the active material layer may be suppressed, and thus the recovery rate of the finally seceded active material may be increased. If air less than 10 mL/min is injected or added per 100 g of the electrode scrap 160 that is put in, the binder and the conductive material are incompletely combusted, and thus the recovery rate of the active material is reduced. If air more than 100 L/min is injected or added, blowing of the active material may occur due to an excessive addition and temperature control may be difficult.

The screening wall 130 may have a mesh structure. The size of a mesh may be appropriately determined so that the current collector 150 does not pass through the screening wall 130. The active material 170 in powder form that has passed through the screening wall 130 may be recovered through a first collector 180 installed in a lower part of the screening wall 130. The current collector 150 that has not passed through the screening wall 130 may be recovered through a second collector 190 installed at the end of the screening wall 130. As described above, when the active material recovery apparatus 100 is used, each of the active material 170 and the current collector 150 may be recovered. As described above, according to the active material recovery apparatus 100 of the present disclosure, the active material 170 may be recovered in its intrinsic shape, and the current collector 150 may also be recycled without melting or throwing away.

The screening wall 130 preferably has a tubular shape with both ends open so that the separated current collector 150 and active material 170 are put therein and the current collector 150 is discharged. A detachment of the active material 170 from the current collector 150 is smooth through the rotation of the rod 110. The rod 110 rotates and stirs the current collector 150 so that the active material 170 is detached from the current collector 150 as well as the current collector 150 and the screening wall 130 collide with each other so that the active material 170 comes off from the current collector 150 by the impact. The screening wall 130 may also be rotated around the axis of the rod 110. If the current collector 150 is in a stopped state because there is no rod 110 that rotates or the screening wall 130 does not rotate, it is not easy for the active material 170 to come off from the current collector 150.

The rotational direction of the screening wall 130 may be the same as or opposite to the rotational direction of the rod 110. The rotational direction of the screening wall 130 may be changed at an appropriate time interval. The screening wall 130 may also be the same as the rotational direction of the heat treatment bath 120. When a connection part between the heat treatment bath 120 and the screening wall 130 is fixed, the heat treatment bath 120 and the screening wall 130 may be rotated together. The heat treatment bath 120 and the screening wall 130 may be configured as a prefabricated type connected to each other or an integral type.

For example, by forming coupling grooves along a main surface in one side of the heat treatment bath 120, and forming coupling protrusions along the main surface on one side of the screening wall 130, ends of the heat treatment bath 120 and the screening wall 130 corresponding to each other may be firmly connected through the coupling grooves and the coupling protrusions. The coupling grooves and the coupling protrusions may be coupled through an interference fitting coupling method or a screw coupling method. The coupling grooves and the coupling protrusions may be coupled in a structure of a locking protrusion and a hook.

As described above, when the heat treatment bath 120 and the screening wall 130 are coaxially arranged in a tubular shape, it is preferable that the active material recovery apparatus 100 continuously performs input of a new electrode scrap and recovery of the active material.

The screening wall 130 does not include merely the heating unit, and thus a cooling section may be formed by using a slow cooling method of natural cooling, and cooling means is further provided outside the screening wall 130, and thus a faster cooling method or temperature-controlled cooling may be possible.

It is preferable that the active material recovery apparatus 100 also has a vibration function. Vibration may give a physical force so that the active material from which the binder and the conductive material are removed after heat treatment secedes from the current collector. When vibration is applied, the active material 170 in the screening wall 130 passes through the screening wall 130 and falls to the first collector 180 therebelow.

Figure 3:
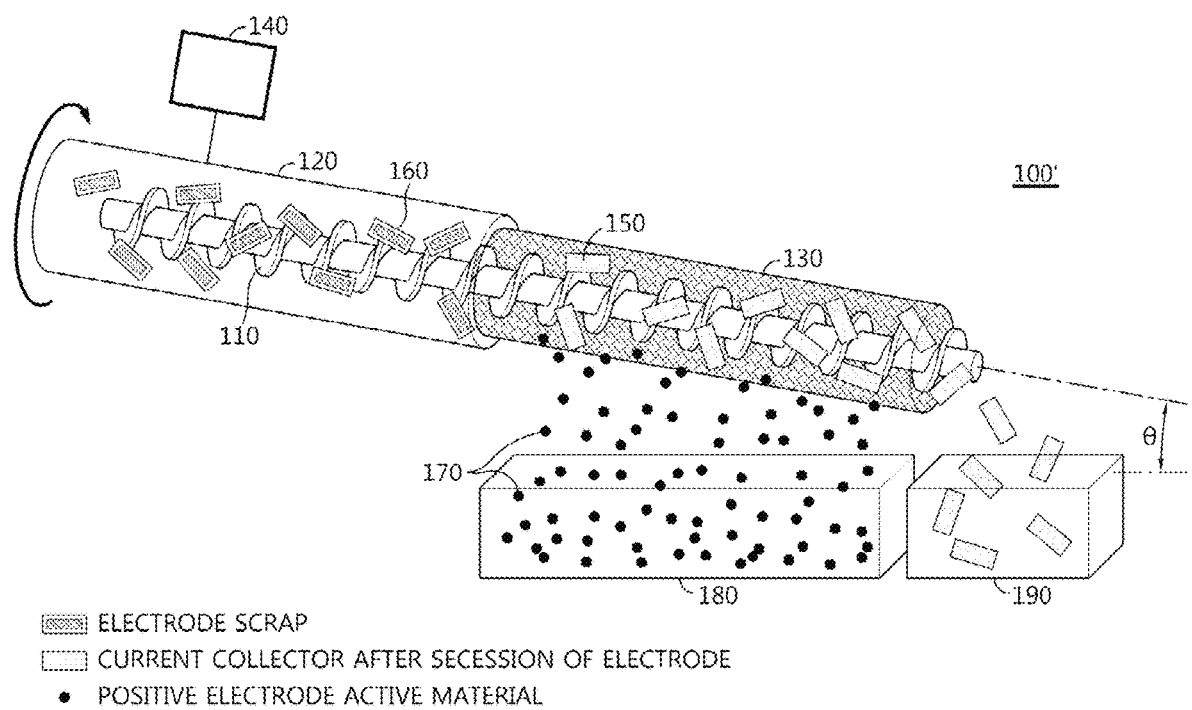
FIG. 3 is a schematic diagram of an active material recovery apparatus according to another embodiment of the present disclosure.

Next, an active material recovery apparatus 100' shown in FIG. 3 is characterized in that an angle θ of the entire active material recovery apparatus 100' is adjusted so that the axis of the rod 110 is inclined with respect to the ground. As shown, the active material recovery apparatus 100' may be supported in a slightly inclined state so that the rear end of the active material recovery apparatus 100', that is, the right side in the drawing, is the lower part. Supports having different heights may be respectively installed at the front and rear lower portions of the active material recovery apparatus 100'.

Adjustment of the angle θ gives an inclination to the ground, and the inclination may allow the current collector 150 and the active material 170 to move downward by the weights of the current collector 150 and the active material 170. As shown, when the inclination is given, the current collector 150 and the active material 170 move slowly from the left side to the right side of the drawing through the heat treatment bath 120 and the screening wall 130, the active material 170 in the screening wall 130 passes through the screening wall 130 and falls to the first collector 180 below the screening wall 130, and the current collector 150 that has not passed through the screening wall 130 falls to the second collector 190 installed at the end of the screening wall 130. The angle θ may be maintained throughout the process in a state set before the process, or may be adjusted and changed as needed during the process.

The active material recovery apparatuses 100 and 100' described above may process a large amount of electrode scraps, thereby greatly increasing work efficiency and reducing work time. In particular, the active material recovery apparatuses 100 and 100' are open type systems that do not block oxygen in the outdoor air and may supply sufficient air or oxygen for the complete combustion of the active material layer. The electrode scrap may be rotated, which makes an air contact smoother, thereby recovering the active material with a uniform quality and a high recovery rate.

Hereinafter, an active material reuse method according to embodiments of the present disclosure will be described with reference to FIGS. 4 and 5. First, FIG. 4 is a flowchart of the active material reuse method according to another embodiment of the present disclosure.

Figure 4:
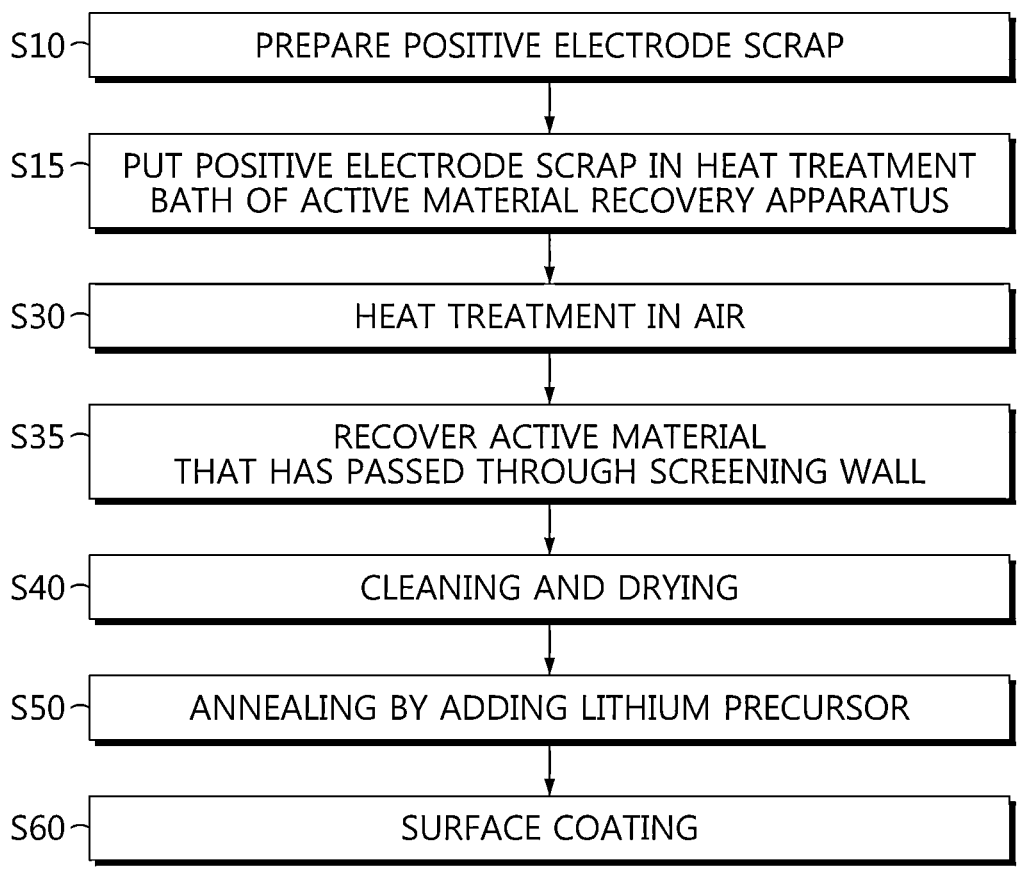
FIG. 4 is a flowchart of an active material reuse method according to another embodiment of the present disclosure.

Referring to FIG. 4, first, a discarded positive electrode scrap is prepared (step s10).

As described above with reference to FIG. 1, the positive electrode scrap may be a part remained after manufacturing a positive electrode sheet including a positive electrode active material layer on a current collector and punching the positive electrode sheet. In addition, the positive electrode scrap may be prepared by collecting positive electrodes in which defects occur during a process. In addition, the positive electrode scrap may be prepared by separating a positive electrode from a discarded lithium secondary battery after use.

For example, a slurry manufactured by adding and mixing N-methyl pyrrolidone (NMP) to an active material that is a lithium cobalt oxide such as $LiCoO_2$(LCO), or an NCM-based active material including nickel (Ni), cobalt (Co) and manganese (Mn), carbon-based carbon black as a conductive material, and polyvinylidene fluoride (PVdF) that is a binder is coated on a sheet type current collector made of aluminum foil, and then, dried in a vacuum oven at about 120° C. to manufacture a positive electrode sheet, and a positive electrode plate of a certain size is punched and the remaining positive electrode scrap may be prepared.

Lithium composite transition metal oxides are used as the positive electrode active material of a lithium secondary battery, and among these, lithium cobalt oxide of $LiCoO_2$, lithium manganese oxide ($LiMnO_2$ or $LiMn_2O_4$, etc.), lithium iron phosphate compound ($LiFePO_4$, etc.) or lithium nickel oxide ($LiNiO_2$, etc.) are mainly used. In addition, as a method of improving a low thermal stability while maintaining an excellent reversible capacity of $LiNiO_2$, a nickel manganese-based lithium composite metal oxide in which a part of nickel (Ni) is substituted with manganese (Mn) having excellent thermal stability and an NCM-based lithium composite transition metal oxide in which a part of nickel (Ni) is substituted with manganese (Mn) and cobalt (Co) are used.

As described above, the positive electrode scrap has an active material layer on a current collector of a metal foil such as aluminum foil. The active material layer is formed by coating a slurry in which an active material, a conductive material, a binder, a solvent, etc. are mixed, and has a structure in which the binder connects the active material and the conductive material after the solvent is volatilized. Therefore, if the binder is removed, the active material may be separated from the current collector.

Next, the positive electrode scrap is put into the heat treatment bath 120 of the active material recovery apparatuses 100 and 100' according to the present disclosure (step s15).

The method may further include a step of crushing the positive electrode scrap to an appropriate size before step s15. Crushing refers to cutting or shredding of the positive electrode scrap into pieces of suitable and easy-to-handle size. After crushed, the positive electrode scrap is cut into small pieces, for example, 1 cm×1 cm. For crushing, various dry grinding equipment such as hand-mill, pin-mill, disk-mill, cutting-mill and hammer-mill may be used, or a high-speed cutter may be used. Crushing may be performed in consideration of the characteristics, for example, fluidity, required in the active material recovery apparatuses 100 and 100' used in the handling of the positive electrode scrap and subsequent processes. Since the active material recovery apparatuses 100 and 100' include the rod 110, the positive electrode scrap may be split while the rod 110 is rotated. Therefore, if the positive electrode scrap is not too large, the positive electrode scrap is put in without being crushed.

Next, the heat treatment bath 120 performs heat treatment on the positive electrode scrap in the air while rotating the positive electrode scrap around the rod 10 to remove a binder and a conductive material in the active material layer and separate the current collector from the active material layer (step s30). Heat treatment may be performed at 300 to 650° C., which may be called high temperature heat treatment. At a temperature less than 300° C., it is difficult to remove the binder, which causes a problem that the current collector may not be separated. At a temperature equal to or greater than 650° C., the current collector melts (Al melting point: 660° C.), which causes a phenomenon that the current collector may not be separated. Thus, a desired heat treatment temperature is obtained by adjusting the temperature of the heating unit of the heat treatment bath 120.

A heat treatment time is maintained so that the binder may be sufficiently thermally decomposed. For example, the heat treatment time is about 30 minutes. Preferably, the heat treatment time is set to be equal to or greater than 30 minutes. The longer the heat treatment time, the longer the time for thermal decomposition of the binder to occur, but there is no difference in the thermal decomposition effect when the heat treatment time exceeds a certain time. Preferably, the heat treatment time is set to be equal to or greater than 30 minutes to 5 hours.

For example, heat treatment may be performed at 550° C. for 30 minutes at a temperature rise rate of 5° C./min. The temperature rise rate may be implemented without difficulty, for example, through the heating unit of the heat treatment bath 120 and may be heated without generating a thermal shock, etc. to the positive electrode scrap. 550° C. is to allow the thermal decomposition of the binder to occur well while considering the melting point of the Al current collector. At this temperature, since heat treatment for less than 10 minutes is insufficient for thermal decomposition, heat treatment should be performed for more than 10 minutes, and for more than 30 minutes if possible.

As the binder and the conductive material in the active material layer are thermally decomposed through heat treatment in the air and become $CO_2$ and $H_2O$ and removed. Since the binder is removed, the active material is separated from the current collector, and the active material to be recovered may be selected in powder form. Accordingly, only in step s30, the current collector may be separated from the active material layer and the active material in the active material layer may be recovered.

It is important to perform heat treatment of step s30 in the air. If heat treatment is performed in a reducing gas or inert gas atmosphere, the binder and the conductive material are not thermally decomposed and only carbonized. When the binder and the conductive material are only carbonized, a carbon component remains on the surface of the active material, which degrades the performance of the reuse active material. When heat treatment is performed in the air, since a carbon material in the binder or the conductive material reacts with oxygen and is burned and removed as CO and $CO_2$ gases, both the binder and the conductive material are almost removed without remaining. The active material recovery apparatuses 100 and 100' are suitable for performing heat treatment of step s30 because a sufficient air contact is possible.

The heat treatment time means a time spent at a desired heat treatment temperature in the heat treatment bath 120. If the heat treatment time is 30 minutes, the process is controlled so that the positive electrode scrap may be heated in the heat treatment bath 120 for 30 minutes and then transferred to the screening wall 130.

Now, the active material in powder form that has passed through the screening wall 130 is recovered (step s35). The active material recovery apparatuses 100 and 100' which are open type systems may almost completely remove the binder and the conductive material through the smooth air contact in the heat treatment bath 120 as described above, and recover the active material in powder form. Since the positive electrode scrap transferred to the screening wall 130 is in a state in which the binder has been removed in a previous step, the current collector and the active material may be completely seceded through the rotation of the rod 110. The carbon component generated by carbonization of the binder or conductive material may not remain on the surface of the active material obtained by passing through the screening wall 130.

As described above, the use of the active material recovery apparatuses 100 and 100' ends. By performing heat treatment using the active material recovery apparatuses 100 and 100', the active material may be recovered with a very high recovery rate, and since the recovered active material has no carbon component, separate treatment for removing the carbon component is not required.

If the recovered active material is reused as it is, this may lead to bad electrode properties. In this regard, as a subsequent process, the present disclosure proposes an active material reuse method that may further include steps such as washing, drying, addition of a lithium precursor, annealing, surface coating, etc.

Next, the recovered active material is washed and dried (step s40). During washing, it is important to wash the recovered active material with a lithium compound aqueous solution showing basicity in an aqueous solution state. This lithium compound aqueous solution is prepared to contain a lithium compound more than 0% and equal to or less than 15%, and preferably uses LiOH. The amount of LiOH is preferably equal to or less than 15%. The use of an excess of LiOH may leave an excess of LiOH on the surface of the active material even after washing, which may affect an annealing process in the future. In order to wash the surface of the active material in a pre-annealing step as much as possible, since an addition of the excess of LiOH is not good for the process, the addition is limited to equal to or less than 15%.

Washing may be performed by immersing the recovered active material in such an aqueous lithium compound solution. After immersion, washing may be performed within one week, preferably within one day, and more preferably within one hour. If washing is performed for more than one week, there is a risk of capacity degradation due to an excessive elution of lithium. Therefore, washing is preferably performed within one hour. Washing includes immersing the active material in the lithium compound aqueous solution showing basicity in the aqueous solution state, stirring the active material in an immersion state, etc. It is good to perform stirring with immersing as much as possible. If the active material is only immersed in the lithium compound aqueous solution without stirring, a washing process may be slowly performed and may cause lithium leaching. Since the process time may be minimized if stirring is performed with immersing, it is preferable to proceed stirring simultaneously with impregnation of the lithium compound aqueous solution. Drying may be performed in the air in a convection type oven after filtration.

The reason for washing with the lithium compound aqueous solution showing basicity in the aqueous solution state is to remove LiF and metal fluoride which may be present on the surface of the recovered active material, and to perform surface modification. During heat treatment of step s30, the binder and the conductive material in the active material layer become $CO_2$ and $H_2O$ and are vaporized and then removed. In this process, $CO_2$ and $H_2O$ react with lithium on the surface of the active material to form $Li_2CO_3$ and LiOH, and fluorine (F) present in a binder such as PVdF reacts with a metal element constituting the positive electrode active material to form LiF or metal fluoride. If LiF or metal fluoride remains, battery properties deteriorate when the active material is reused. In the present disclosure, reactants that may have been generated on the surface of the reuse active material during heat treatment of step s30 are removed by adding washing of step s40, and thus foreign substances do not remain on the surface of the active material.

Emphatically, it is important to wash the recovered active material with the lithium compound aqueous solution showing basicity in the aqueous solution state in step s40. If an aqueous solution of sulfuric acid or hydrochloric acid is used rather than the lithium compound aqueous solution showing basicity in the aqueous solution state, F on the surface of the active material may be washed, but the performance of the reuse positive electrode active material degrades by eluting transition metals (Co and Mg) present in the active material. The lithium compound aqueous solution showing basicity in the aqueous solution state used in the active material reuse method according to the present disclosure is very desirable because the lithium compound aqueous solution may remove the binder that is likely to remain in a trace amount even after the thermal decomposition of step s30 as well as may supplement the amount of lithium that may be eluted in the washing process without eluting the transition metal, etc. present in the active material.

Through step s40, in the present disclosure, it is possible to adjust the content of LiF on the surface of the recovered active material to less than 500 ppm, through which the capacity improvement effect may be achieved. Preferably, the content of F may be set to be equal to or less than 100 ppm. More preferably, the content of F may be set to be equal to or less than 30 ppm.

Next, a lithium precursor is added to the washed active material and annealed (step s50).

A loss of lithium in the active material intends may occur during previous steps s30 and s40. In step s50, such loss of lithium is compensated.

Furthermore, in step s50, the properties of the reuse active material are restored or improved to the level of a fresh active material that has never been used by restoring a crystal structure of the active material through annealing.

Through the previous steps s30 and s40, a deformed structure may appear on the surface of the active material. For example, in the active material which is an NCM-based lithium composite transition metal oxide, in step s40, a spinel structure in which Ni is rock salted [$NiCO_3 \cdot 2Ni(OH)_2)H_2O$] by moisture may be formed. If a battery is manufactured as it is, battery properties such as capacity reduction may deteriorate. In the present disclosure, the crystal structure is restored through step s50. For example, the active material which is the NCM-based lithium composite transition metal oxide is restored to a hexagonal structure again. Accordingly, it is possible to restore or improve the initial properties of the active material to a level similar to that of the fresh active material.

The lithium precursor of step s50 may include at least one of LiOH, $Li_2CO_3$, $LiNO_3$ and $Li_2O$.

The lithium precursor is added by an amount that may be added as much as a ratio of lithium lost compared to a ratio of lithium to other metals in the raw material active material (i.e., a fresh active material) used in the active material layer before heat treatment. For example, when the ratio of lithium to other metals in the fresh active material is 1, the lithium precursor may be added by an amount of lithium that may be added at a molar ratio of 0.001 to 0.4. An amount of lithium at a molar ratio of 0.01 to 0.2 is properly added. The addition of an excess amount of lithium precursor other than the amount of lithium lost through washing, etc. causes an unreacted lithium precursor to remain in the reuse active material, which serves to increase resistance in an active material reuse process, and thus it is necessary to administer an appropriate amount of the lithium precursor.

In addition, the lithium precursor is preferably added by an amount of lithium that may be further added at a molar ratio of 0.0001 to 0.1 with respect to 1:1 that is a molar ratio of lithium to other metals. The reason for adding the excess lithium as described above is to form a surface protective layer by surface coating on the active material, which will be further described below. In the case of manufacturing a secondary battery using such an active material, it is possible to maintain a lifespan characteristic while suppressing a side reaction caused by an electrolyte.

Annealing of step s50 may be performed at 400 to 1000° C. in the air. An annealing temperature may be 600 to 900° C. This temperature should be changed within a limited range depending on a type of the lithium precursor. It is preferable to set the annealing time to be equal to or greater than one hour. Preferably, the annealing time is about 5 hours. If the annealing time is long, the crystal structure may be sufficiently recovered, but even if the annealing time is a long time, the performance of the active material is not significantly affected. The annealing time is, for example, within 15 hours.

For example, when $Li_2CO_3$ is used as a lithium precursor, the annealing temperature is preferably 700 to 900° C., more preferably 710 to 780° C. This is because the melting point of $Li_2CO_3$ is 723° C. Most preferably, annealing is performed at 750° C. In the case of using LiOH as a lithium precursor, the annealing temperature is preferably 400 to 600° C., more preferably 450 to 480° C. This is because the melting point of LiOH is 462° C.

The annealing temperature is preferably a temperature exceeding the melting point of the lithium precursor. However, at a temperature exceeding 1000° C., thermal decomposition of the positive electrode active material occurs and the performance of the active material deteriorates, and thus the temperature should not exceed 1000° C.

When up to step s50 is performed, a reusable active material may be obtained. Reusable means that an active material is in a state in which the active material may be directly put into a slurry production like a fresh active material without any additional additives or additional treatment for adjusting components.

Next, as a selective step, step s60 may be further performed. In step s60, surface coating is applied to the active material annealed in step s50.

The surface coating step may be coating at least one of metal, organic metal and a carbon component on the surface in a solid or liquid manner and then heat treating the coated one at 100 to 1200° C. When heat treatment is performed at a temperature exceeding 1200° C., there is a risk of performance degradation due to thermal decomposition of the positive electrode active material. In the surface coating step, coating on the surface in the solid or liquid manner may use methods such as mixing, milling, spray drying, grinding, etc.

A surface protective layer is formed by a heterogeneous metal through surface coating. When a molar ratio of lithium to other metals in the positive electrode active material is 1:1, if the lithium in the active material reacts with a surface coating material, and the molar ratio of lithium to other metals in the positive electrode active material decreases to less than 1:1, 100% capacity expression may not be achieved. Therefore, insufficient lithium is added in the previous step s50 so that not only the molar ratio of lithium to other metals in the positive electrode active material is 1:1 but also further an excess of lithium is added to include more lithium by a molar ratio of 0.0001 to 0.1 compared to other metals in the positive electrode active material. Then, during surface coating, the molar ratio of lithium to other metals in the positive electrode active material is 1:1, and the surface protective layer may be formed.

Specifically, when a metal oxide such as B, W, B—W, etc. coated on the active material and then heat treated, a lithium boron oxide layer may be formed on the surface of the active material and serves as the surface protective layer. The lithium that is more added at the molar ratio of 0.0001 to 0.1 in step s50 reacts with the metal oxide such as B, W, B—W, etc. in step s60, and the molar ratio of lithium to other metals in the positive electrode active material does not decrease to less than 1:1, and thus there is no capacity degradation.

The reusable active material obtained by the above-described method may be represented by the following chemical formula 1.

 [Chemical Formula 1]

(In Chemical Formula 1 above, M includes at least one selected from the group consisting of B, W, Al, Ti and Mg, $1<a\leq1.1$, $0\leq x\leq0.95$, $0\leq y\leq0.8$, $0\leq z\leq1.0$, $0\leq w\leq0.1$, $-0.02\leq\delta\leq0.02$, and $x+y+z+w=1$.)

The reusable active material may have a content of F equal to or less than 100 ppm. According to the present disclosure, since it is possible to recover an active material having a reduced content of F, if the active material having the reduced content of F is reused as an active material, excellent resistance properties and capacity properties may be implemented.

As described above, according to the present disclosure, the active material may be recovered through simple heat treatment (step s30). LiF or metal fluoride is removed during washing of step s40. The washing and drying step using the lithium compound aqueous solution showing basicity in the aqueous solution state has advantage of being safe and inexpensive, removing LiF or metal fluoride without loss of other elements, preventing elution of transition metals, etc. and supplementing the loss of lithium occurring during the process. The annealing step s50 also has advantage of being safe and inexpensive, recovering the cell properties of the reuse active material by recovering the crystal structure, that is, by improving crystallinity.

The reusable active material obtained according to the present disclosure may have a particle size distribution similar to that of the fresh active material, and thus a separate treatment for adjusting the particle size distribution may not be required. In particular, since the carbon component generated by carbonization of the binder or the conductive material does not remain on the surface through the active material recovery apparatuses 100 and 100' suitable for heat treatment, a step for removing the carbon component, etc. is not required. Accordingly, the active material obtained through the method of FIG. 4 described above may be reused as it is without additional treatment and used to manufacture the positive electrode.

It is also possible to use 100% of the reuse active material as it is without adjusting the composition, or mix the reuse active material with a fresh active material and mix the reuse active material with a conductive material, a binder, and a solvent to make and use a slurry.

Figure 5:
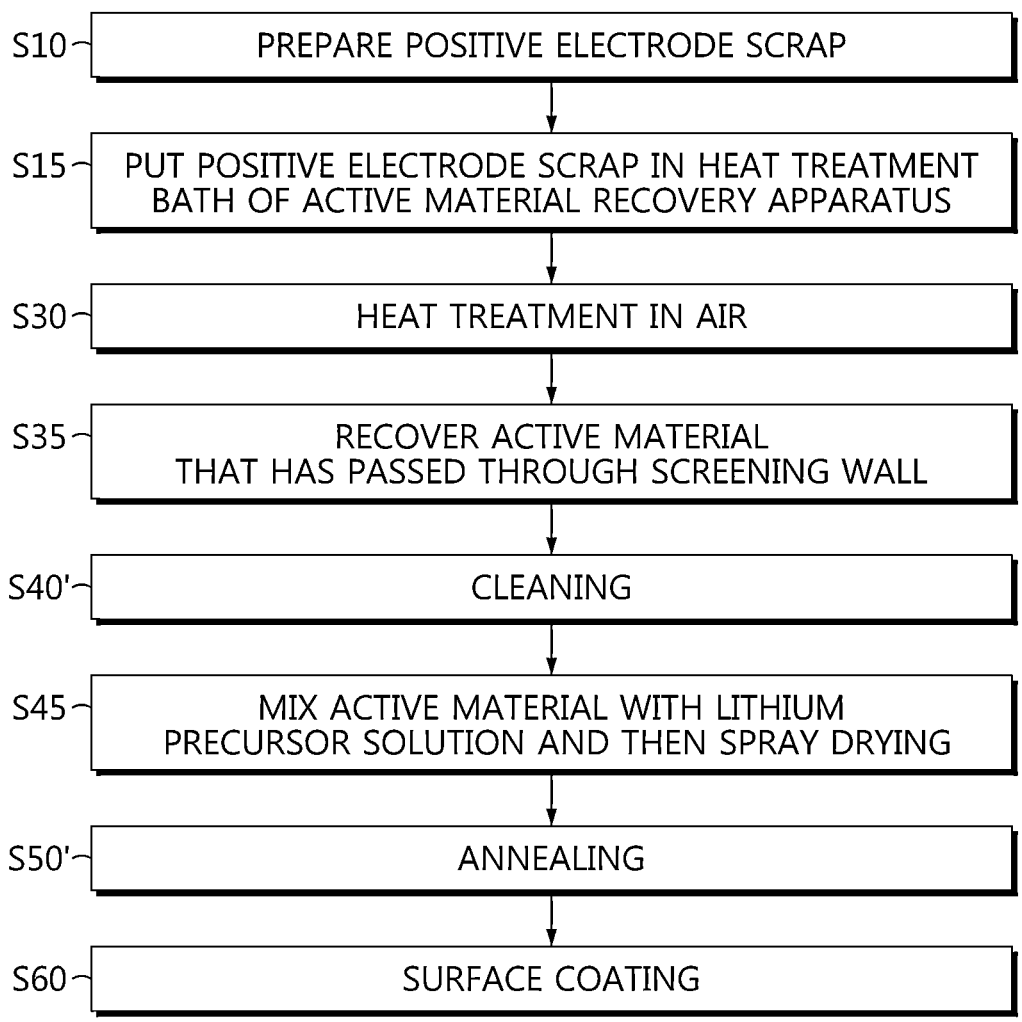
FIG. 5 is a flowchart of an active material reuse method according to another embodiment of the present disclosure.

Next, FIG. 5 is a flowchart of an active material reuse method according to another embodiment of the present disclosure. In FIG. 5, the same reference numerals are assigned to the same steps as in FIG. 4, and repeated descriptions are omitted.

Referring to FIG. 5, steps s10 to s35 described with reference to FIG. 4 are performed in the same manner. Then, a recovered active material is washed (step s40'). A washing method, a solution used for washing, etc. are the same as in step s40 of FIG. 4.

Here, the washed active material is not dried but directly mixed with a lithium precursor solution and spray dried (step s45).

Loss of lithium in the active material may occur during previous steps s30 and s40'. In step s45, such loss of lithium is more simply and definitely supplemented.

As a lithium precursor solution, a lithium compound soluble in an aqueous solution or an organic solvent may be used. In particular, the lithium precursor of step s45 may preferably include at least one of LiOH, $Li_2CO_3$, $LiNO_3$ and $Li_2O$.

The temperature of the spray drying step may be preferably equal to or more than 100° C. When the temperature is equal to or less than 80° C., a problem in which the solution is not completely dried may occur. More preferably, temperature of the spray drying step may be 100 to 300° C.

If the active material is dried in an oven, etc. immediately after a surface modification process by washing in step s40', active material particles may agglomerate to form a lump. To mix the lithium precursor with these agglomerated particles, grinding on the lump may be necessary, and to mix a solid lithium precursor, a powder mixing or milling process is required upon mixing of materials. In that case, the process is complicated and a continuous process is difficult. In addition, in the case of an NCM-based positive electrode active material, when powder mixing, milling, etc. are performed on the positive electrode active material and the lithium precursor in the presence of moisture, the positive electrode active material eats the moisture so that an agglomeration phenomenon occurs severely. Therefore, the present embodiment proposes mixing and dispersing the active material in the lithium precursor solution without drying after washing in step s40', and spray drying the active material. Then, particle agglomeration due to drying and inconvenience of mixing the solid lithium precursor may be eliminated. That is, there may be an advantage in that the active material is produced in powder form rather than a lump by spray drying.

During spray drying, as the lithium precursor solution is dried immediately after spraying, the lithium precursor component is coated or contacted on the surface of the active material. In this regard, there is also an advantage in that particles are agglomerated by a capillary force when drying the lithium precursor solution which is a solvent, and the particles are adjusted. In the case of a positive electrode scrap made of an electrode, the particles on the surface may be pressed and cracked or broken by the rolling process. In particular, compared to LCO, the NCM-based active material has high particle splitting due to rolling during formation of the electrode. Compared to a fresh active material, since the recovered active material includes many small particles, there is a problem of non-uniformity in the particles.

In particular, the NCM-based active material including large particles that are secondarily granulated by gathering primary particles having a size of several tens to hundreds of nm is used. In a process of rolling a positive electrode made of such an active material so as to adjust the porosity in the electrode, secondary particles are split to be primarily granulated or smaller particles that have larger sizes than that of the secondary particles but are smaller than large particles. Since the specific surface area of the active material increases as the number of particles broken by rolling increases, in the case of a reuse active material obtained from the rolled electrode, there may be problems that may affect slurry properties, electrode adhesion, and electrode performance when reused.

In order for the active material to be at a reusable level, it is desirable that the particle size distribution should not be different from that of the fresh active material. Since spray drying may recover large particles by aggregating small particles that are split during rolling, spray drying may solve the non-uniformity in the particles and also make a particle size close to the initial characteristics of the fresh active material. In particular, the effect is excellent in the NCM-based active material which has severe particle breakage during the rolling of the previous process. Therefore, it is expected that properties of a battery reusing the active material recovered using the method according to the present disclosure will be similar to properties of a battery using the fresh active material.

As described above, through the spray drying step (s45), the lithium precursor is coated on the surface of the active material, and the active material is obtained by adjusting the particles. Since the addition of the lithium precursor, granulation, and drying are performed in one step, there is an effect of simplifying the process. In addition, spray drying is special in that it is not means for simply obtaining the active material, but means for again granulating particles that have been previously used and broken by rolling, etc.

In addition, if the active material particles washed in step s40' is merely mixed and dispersed in the lithium precursor solution of a certain concentration, step s45 proceeds, and thus there is an advantage that a continuous process is possible for washing in step s40' and spray drying in step s45. As such, in the active material reuse method according to the present embodiment, there is a continuity of the process, and there is an advantage in that coating of the lithium precursor, drying, and granulation (particle readjustment) are performed simultaneously in one step.

Here, the lithium precursor is also added by the amount as much as added in step s50 described with reference to FIG. 4 that is an amount that may be added as much as a ratio of lithium lost compared to a ratio of lithium to other metals in the fresh active material.

Next, the active material that is spray dried is annealed (step s50'). Since the lithium precursor is added to the active material in step s45, in this step, annealing may be performed immediately after spray drying without adding an additional lithium precursor. An annealing effect of step s50' is the same as that of step s50 described with reference to FIG. 4. Thereafter, if necessary, surface coating of step s60 may be further performed.

Meanwhile, another positive active material reuse method using the active material recovery apparatuses 100 and 100' is also possible. For example, the heat treatment time of step s30 described with reference to FIG. 3 may be set within one hour, preferably within 30 minutes. The longer the heat treatment time, the longer the time for thermal decomposition of the binder to occur, but there is no difference in the thermal decomposition effect when the heat treatment time exceeds a certain time, and on the contrary, it is not good since many reaction products such as LiF which are harmful to the battery performance are generated. Therefore, a method capable of minimizing the generation of unwanted foreign substances that may adversely affect the battery performance by limiting the heat treatment time to within one hour, preferably 30 minutes is possible.

In this case, steps s50 and s60 may be performed immediately after step s30 and step s35 of FIG. 3 without step s40. That is, as a result of shortening heat treatment, the washing step may be omitted. As described above, according to another embodiment of the present disclosure, a reusable active material may be obtained with only two steps of heat treatment in the air (step s30) and annealing after addition of the lithium precursor (step s50). In particular, since heat treatment is performed for a very short time, preferably within 30 minutes, there is an advantage in that an additional step such as washing for removing the reaction products that adversely affect the battery properties is not required by suppressing the reaction products.

Meanwhile, another positive active material reuse method using the active material recovery apparatuses 100 and 100' is also possible. For example, the washing time of step s40 described with reference to FIG. 4 is shortened within one hour, preferably within 10 minutes. If washing is performed for a long time, there is a risk of capacity degradation due to an excessive elution of lithium. Thus, a method capable of minimizing the elution of lithium by limiting the washing time and shortening washing.

In this case, only the lithium precursor aqueous solution used as a washing liquid in step s40 is sufficient to supplement loss of lithium. Therefore, annealing may be performed without adding an additional lithium precursor to the washed active material. That is, if the washing time of step s40 in FIG. 4 is set to be very short, annealing may be performed immediately as in step s50' of FIG. 5.

As described above, according to the present disclosure, various methods of obtaining a reusable positive electrode active material are possible, and may be performed more efficiently by using the active material recovery apparatus of the present disclosure optimized for separation of the current collector and the active material layer.

Hereinafter, experimental examples of the present disclosure will be described in detail.

Experimental Example 1

Samples 1 and 2 were set using methods below, positive electrode scraps were heat treated by the respective methods, and then an active material recovery rate was evaluated.

Sample 1:

The positive electrode scraps were simply stacked in a furnace and then heat treated. This is a case where the positive electrode scraps are placed as a fixed type in the furnace.

Figure 6:
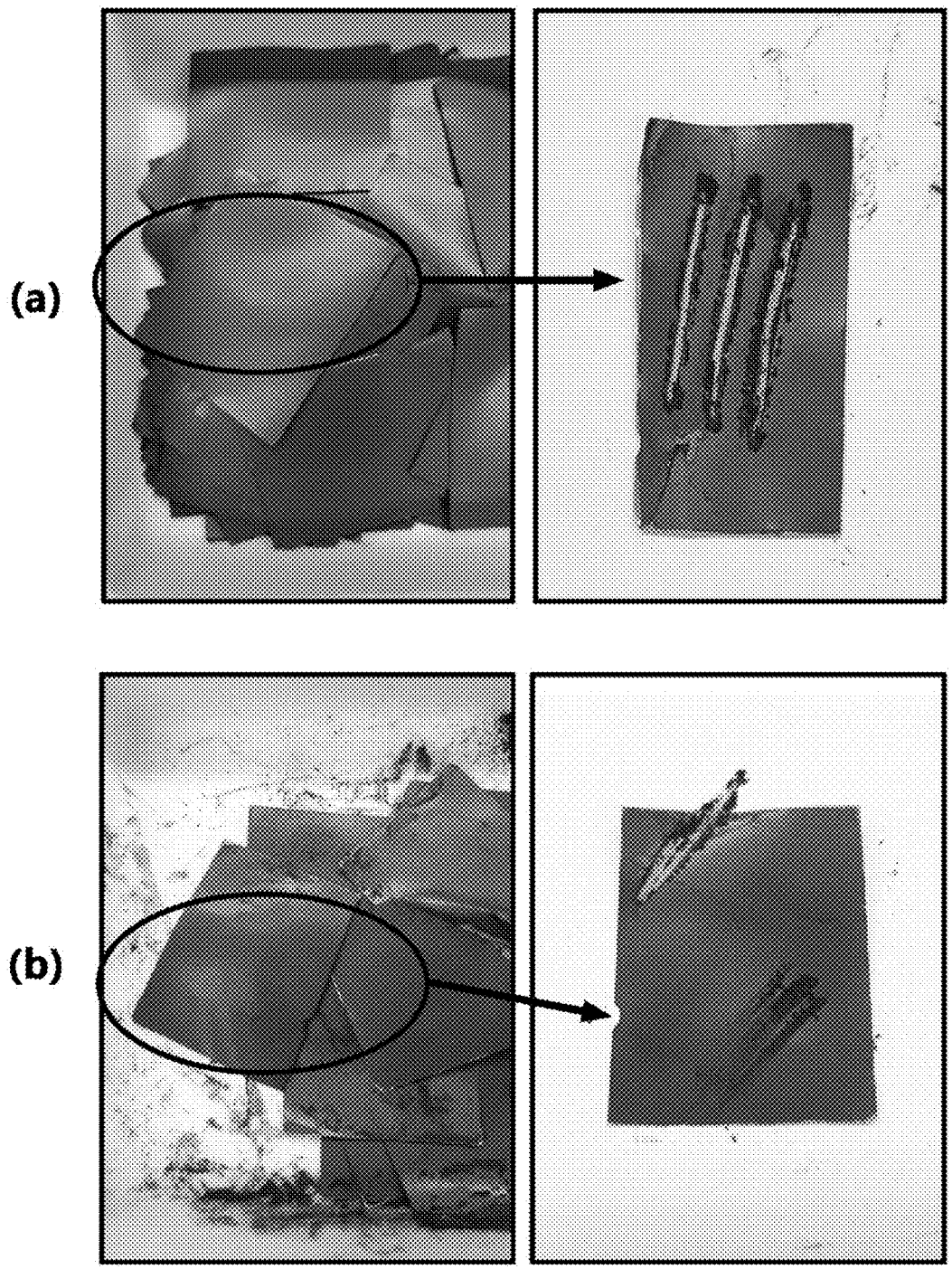
FIG. 6 is a picture showing a difference in heat treatment results according to a location of a positive electrode scrap in Sample 1.

FIG. 6 is a picture showing a difference in heat treatment results according to a location of the positive electrode scrap in Sample 1.

FIG. 6(a) is a picture of the positive electrode scrap located on the surface among the stacked positive electrode scraps. In the case of this positive electrode scrap, it was observed that the active material was separated from a current collector as a binder and a conductive material were thermally decomposed by a contact with air due to an exposure to the outside, but a place where less thermal decomposition occurs, that is, an active material layer was not separated from the current collector due to an incomplete combustion in which sufficient air and oxygen were not supplied rather was strongly carbonized and attached to the current collector was also observed.

FIG. 6(b) is a picture of the positive electrode scrap located inside among the stacked positive electrode scraps. In the case of this positive electrode scrap, it is evaluated that a contact with air was insufficient because the positive electrode scrap was in contact with different positive electrode scraps at the top and bottom. Quite many places where less thermal decomposition occurs and the active material layer is carbonized and attached to the current collector were observed.

As such, it was confirmed that, when the positive electrode scraps were stacked in stack form and heat treated as the fixed type, since the active material is not separated from the current collector due to the incomplete combustion, the recovery rate was very poor. A result that when 100 g of positive electrode scraps is heat treated, about 40 g of positive electrode scraps is not recovered was obtained.

Sample 2:

The positive electrode scraps were erected in the furnace to have more air contact than Sample 1, and then heat treated. This is a case where the positive electrode scraps are placed as the fixed type in the furnace, but distances between the positive electrode scraps are secured to maximize the surface in contact with air.

Figure 7:
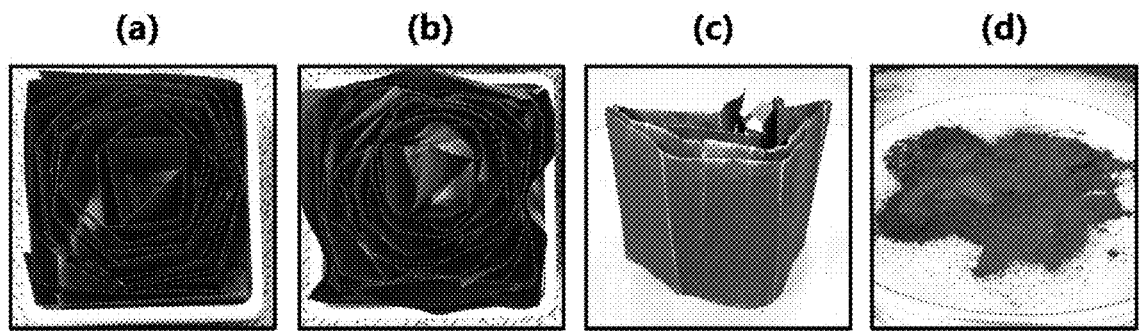
FIG. 7 is a picture showing a state of Sample 2 by time according to an experimental process.

FIG. 7 is a picture showing a state of Sample 2 by time according to an experimental process.

FIG. 7(a) is a picture showing a state of shredded positive electrode scraps that are stacked upright in a crucible. FIG. 7(b) is a picture showing a state of the positive electrode scraps that are put in a furnace and heat treated at 550° C. in the air for 30 minutes. FIG. 7(c) is a picture showing the positive electrode scraps that were heat treated are taken out from the crucible. FIG. 7(d) is a picture showing a state of an active material in powder form that is recovered from the surface of the positive electrode scraps.

In Sample 2, unlike Sample 1, a result that most of the active material is seceded and recovered from a current collector was obtained. The recovery rate was equal to or more than 95%. Through this, it was confirmed that a meaningful amount of the active material may be recovered only by heat treatment in the air without using acid or NMP. In particular, the active material recovery apparatus of the present disclosure was invented based on that if a contact area with air may be further increased, since even a part (5%) of the active material remaining in the current collector may be seceded, the recovery rate of the active material may be further increased. Compared to Comparative Example 2, the active material recovery apparatus of the present disclosure is a portable type that rotates the positive electrode scrap and has the recovery rate much higher than 95% since the contact with air is smoother.

Experimental Example 2

Each positive electrode active material was prepared using methods as in Examples and Comparative Examples below, and electrochemical performance thereof was evaluated.

Example 1

A reuse active material was collected according to the active material reuse method of the present disclosure as described above with reference to FIG. 4. A positive electrode scrap to be discarded after punching a positive electrode plate having an NCM-based lithium composite transition metal oxide active material was prepared and heat treatment of step s30 was performed at 500° C. for 30 minutes. Washing of step s40 was performed for 10 minutes using LiOH. In step s50, with respect to the molar ratio of lithium to other metals in the raw material active material (ICP analysis), a lithium precursor ($Li_2CO_3$) of an amount by which lithium may be further add at a molar ratio of 0.09 during the process was administered and annealed at 750° C. for 15 hours. Theoretically, in the case of a fresh active material, the molar ratio of lithium to other metals is 1:1, but since an average error of an ICP active material recovery apparatus which is an active material recovery apparatus that checks the molar ratio is ±0.05, preferably about ±0.02, the molar ratio of lithium to other metals of the raw material active material through ICP measurement may be 1±0.05:1. In the present experiment, the lithium precursor was added with respect to the analysis ratio through the ICP analysis.

Example 2

In addition to Example 1, an active material surface protective layer recovery process of optional step s60 of FIG. 4 was also performed.

Comparative Example 1

A fresh NCM-based lithium composite transition metal oxide was used, other than a reuse active material.

Comparative Example 2

In the active material reuse method of the present disclosure as described above, only heat treatment of step s30 is performed to remove the binder and the conductive material, separate the Al current collector, and collect the NCM-based lithium composite transition metal oxide active material. Step s30 was performed under the same conditions as in Example 1. In the active material reuse method of the present disclosure, surface modification of step s40, crystal structure recovery of step s50, and a surface coating process of step s60 were not performed.

Comparative Example 3

Further to Comparative Example 2, in the active material reuse method of the present disclosure as described above, up to surface modification of step s40 was performed to collect the active material. That is, while surface modification was performed, in the active material reuse method of the present disclosure as described above, crystal structure recovery of step s50 and the surface coating process of step s60 were not performed. Step s40 was performed under the same conditions as in Example 1.

Comparative Example 4

Further to Comparative Example 2, in the active material reuse method of the present disclosure as described above, surface modification of step s40 was not performed and only up to crystal structure recovery of step s50 was performed to collect the NCM-based lithium composite transition metal oxide active material. Annealing for crystal structure recovery was performed without adding the lithium precursor unlike in Example 1.

Comparative Example 5

In the same manner as Example 1, only up to steps s30, s40, and s50 were performed. However, annealing for crystal structure recovery was performed without adding the lithium precursor unlike in Example 1.

ICP analysis was performed on the positive active materials recovered from or prepared in Examples and Comparative Examples, and a remaining amount of LiF, a ratio of lithium and other metals in the active material, and an amount of a specific element such as B or W were also analyzed.

The positive electrode was manufactured from a slurry prepared by weighing 96.25 wt % of the positive active material recovered from or prepared in each of Examples 1 and 2 and Comparative Examples 1 to 5 above, 1.5 wt % of carbon black that is a conductive material, and 2.25 wt % of PVdF that is a binder and mixing them with NMP, then the cell (Coin Half Cell, CHC) was manufactured, and electrochemical performance thereof was evaluated.

To know the amount of LiF remaining in the active material recovered in Comparative Examples 2 and 3, F was detected and analyzed by ICP. The results are shown in Table 1 below.

TABLE 1

|  | Comparative Example 2 | Comparative Example 3 |
|---|---|---|
| Content of F (mg/kg) | 1450 | ND |

ND means that the content of F equal to or less than 30 ppm is measured. Referring to Table 1 above, it may be seen that the content of F in the recovered positive active material was significantly reduced in Comparative Example 3 as compared to Comparative Example 2. That is, it may be confirmed that LiF is completely dissolved in a lithium compound aqueous solution by washing and removed to the extent that LiF may not be detected by ICP. Therefore, it may be seen that removal of LiF is excellent by step s40.

To see if there is a change in a lithium component in the positive active material during steps s30 and s40 of the present disclosure, the ratio of lithium to other metals in the active material was analyzed by ICP. The results are shown in Table 2 below.

TABLE 2

|  | Comparative Example 1 | Comparative Example 2 | Comparative Example 3 |
|---|---|---|---|
| Ratio of lithium to other metals in active material | 0.99 | 0.95 | 0.91 |

Referring to Table 2, it may be seen that the ratio of lithium to other metals in the active material decreases about 0.2 to 0.5 in Comparative Example 2 compared to Comparative Example 1 through heat treatment of s30, and about 0.2 to 0.5 in Comparative Example 3 compared to Comparative Example 2 through washing and drying of s40. The NCM-based lithium composite transition metal oxide appears to have a relatively large particle specific surface area and a great decrease in the ratio of lithium to other metals due to a change to a spinel structure. Therefore, it may be seen that insufficient lithium must be supplemented.

Table 2 shows the values measured by the ICP analysis, and as mentioned above, the ICP analysis has an error value of about ±0.02. Therefore, even in Comparative Example 1 which is the fresh active material, the ratio between lithium to other metals may be less than 1. Therefore, an amount of lithium precursor added to supplement loss of lithium is added by the content of lithium as much as decreased with respect to the ratio of lithium and other metals (a molar ratio analyzed by ICP) in a raw material active material (i.e., the fresh active material) used in the active material layer.

Figure 8:
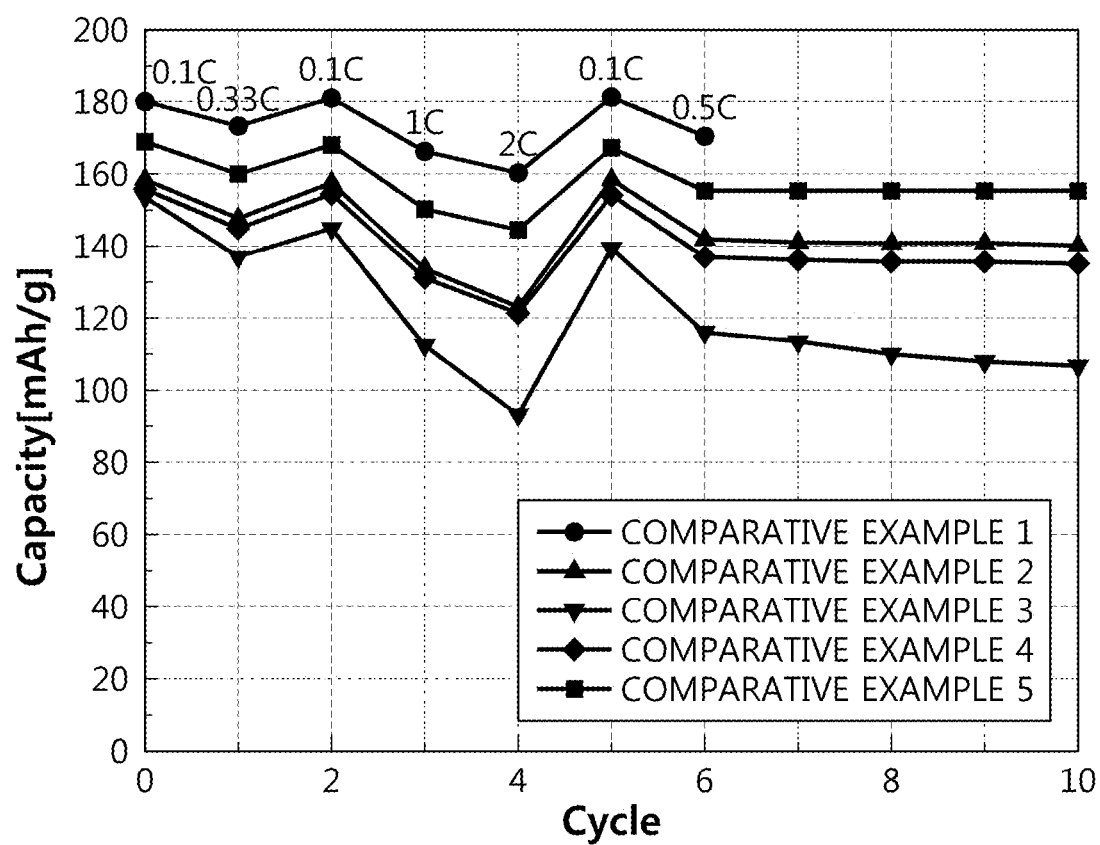
FIGS. 8 and 9 show results of cell evaluation using active materials of Examples 1 and 2 and Comparative Examples 1 to 5.
Figure 9:
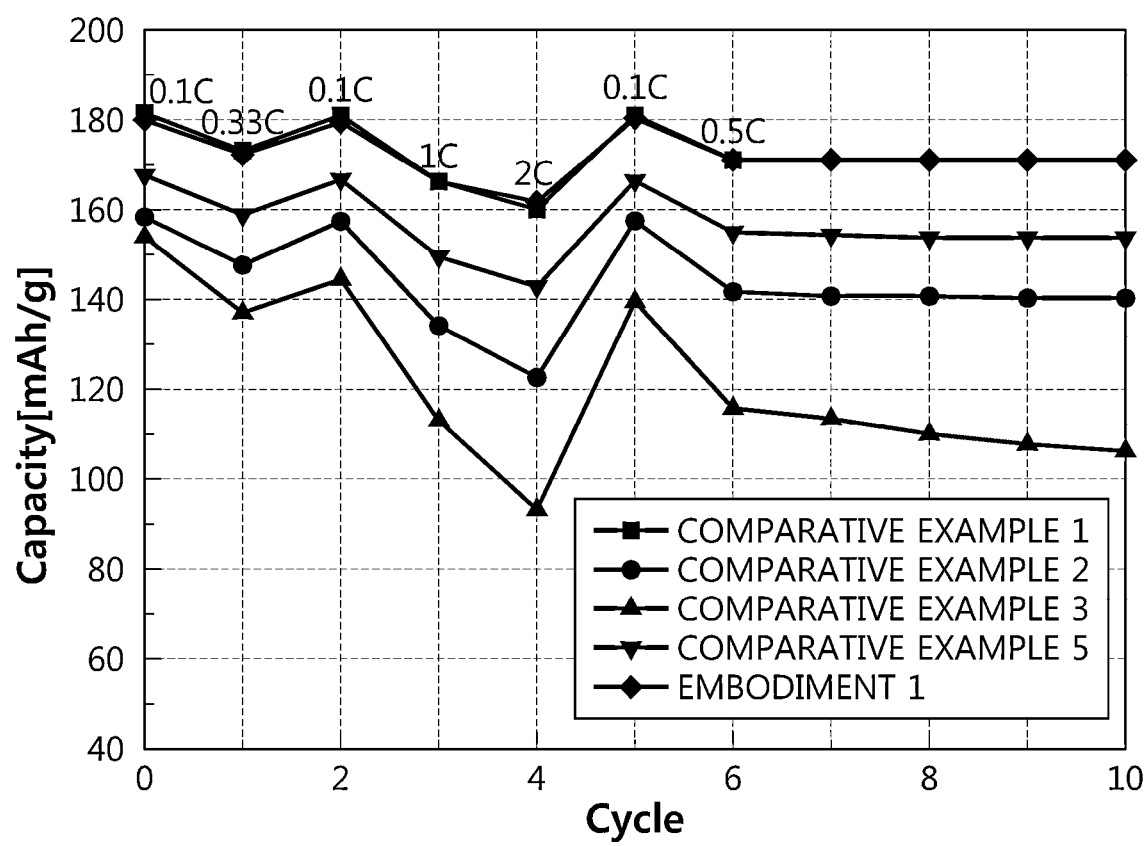

FIGS. 8 and 9 show results of cell evaluation using the active materials of Examples 1 and 2 and Comparative Examples 1 to 5. The rate performance was reviewed by evaluating the capacity according to the number of cycle repetitions at different currents. The active material recovery apparatus used for evaluation is a general charging/discharging test apparatus that is well used in the laboratory. There is no deviation according to a measuring apparatus or method. In the graphs of FIGS. 8 and 9, the horizontal axis indicates the number of cycles and the vertical axis indicates the capacity.

The voltage was set to 3 to 4.3V, and initial formation charging/discharging was performed at 0.1 C/0.1 C. An electrolyte constituting the cell that is carbonate-based, has 3:7 of ethylene carbonate (EC) to ethyl methyl carbonate (EMC), and partially includes an additive was used.

First, referring to FIG. 8, after primary heat treatment (550° C./30 minutes) for secession, upon reviewing Comparative Example 2 before surface modification and Comparative Example 3 after surface modification, the electrode capacity rapidly decreases in Comparative Example 3 in which surface modification was performed. This is because, as mentioned above, Ni in the NCM-based lithium composite transition metal oxide was rock salted by moisture, and the capacity thereof decreased.

However, when annealing (750° C./15 hours) is performed without surface modification, this corresponds to Comparative Example 4 which has almost no capacity improvement effect compared to Comparative Example 2. This is because of LiF remaining on the surface of the active material when surface modification is not performed. This has been shown in Table 1 above that LiF is removed to a satisfactory level only when washing is performed.

When surface modification and annealing are performed after primary heat treatment, the capacity is increased as shown in Comparative Example 5. This is because, although the capacity is decreased as in Comparative Example 3 after the surface modification step, Ni rock salt decreases through annealing after LiF is removed by surface modification and the structure is restored to a hexagonal crystal.

Next, referring to FIG. 9, the capacity improvement of Example 1 compared to Comparative Example 5 is confirmed. In Example 1, a lithium precursor was added during annealing compared to Comparative Example 5. By adding the lithium precursor as such, it may be seen that the capacity is improved by supplementing the lithium lost in the previous steps. The loss of lithium occurred through heat treatment and washing has been described with reference to Table 2.

Based on the results of ICP analysis (Table 2), the lithium compound was added as much as a ratio of loss compared to the content of lithium in the existing positive electrode active material. As a result, it was confirmed through an additional experiment that when a molar ratio of 0.09 to 0.1 is added, the capacity improvement effect equivalent to that of Comparative Example 1 is obtained.

As described above, according to the present disclosure, the active material may be recovered from the positive electrode scrap so as to be directly reused. It is safe because a toxic and explosive solvent such as NMP, DMC, acetone, and methanol is not used, and it is suitable for mass production because simple and safe methods such as heat treatment, washing and drying, and annealing are used.

Figure 10:
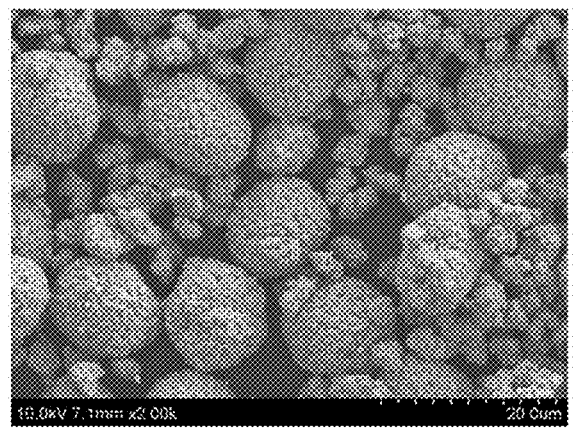
FIGS. 10 and 11 are scanning electron microscope (SEM) pictures of the active materials of Example 1 and Comparative Examples 1 to 3 and 5.
Figure 10:
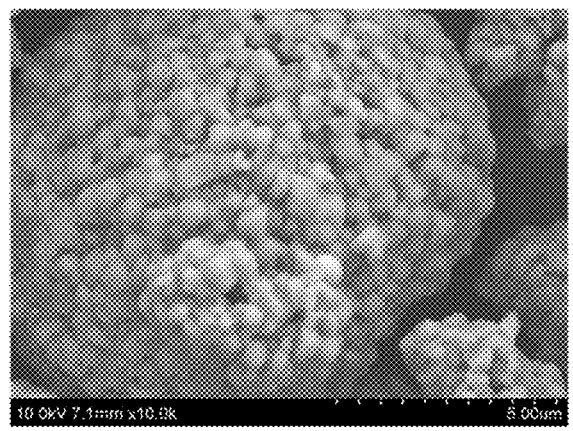
Figure 10:
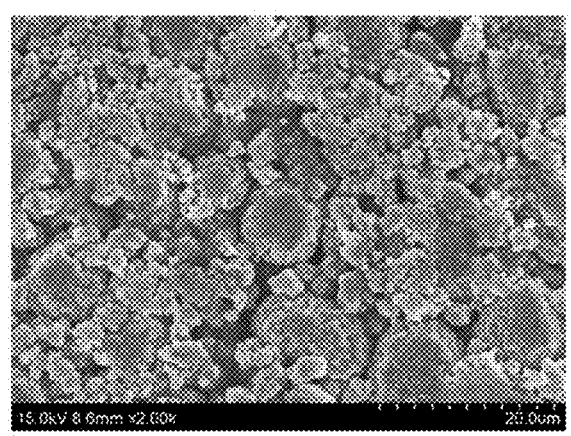
Figure 10:
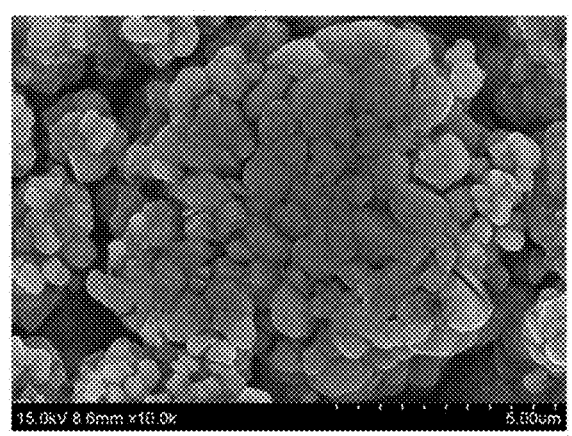
Figure 10:
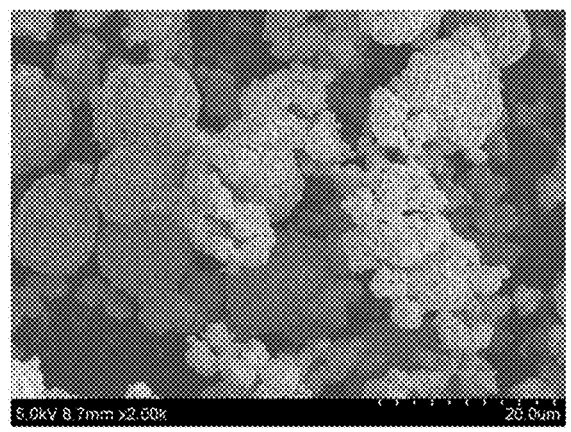
Figure 10:
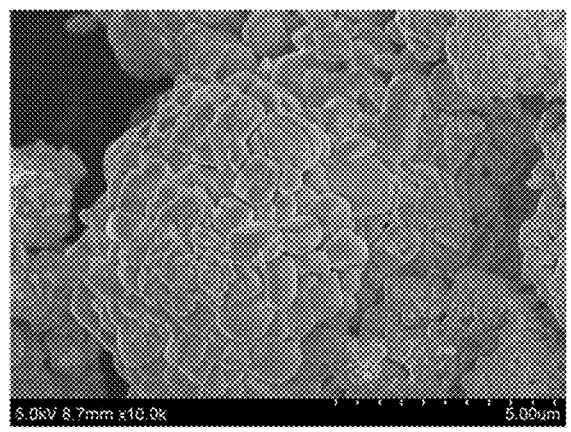
Figure 11:
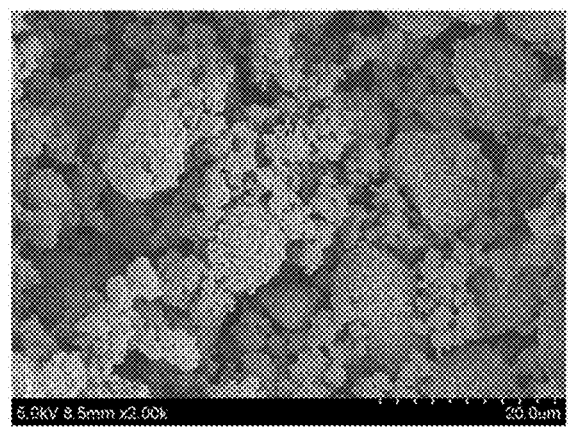
Figure 11:
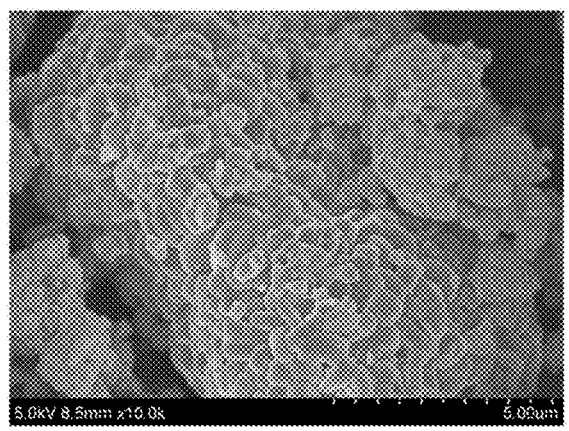
Figure 11:
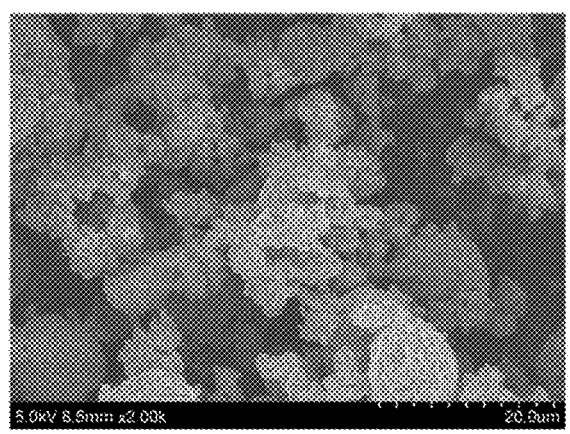
Figure 11:
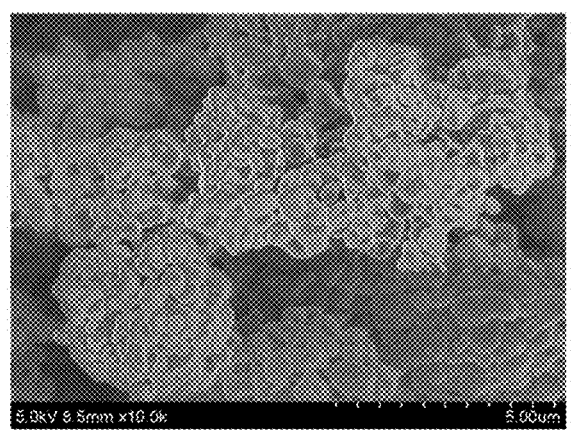
Figure 11:
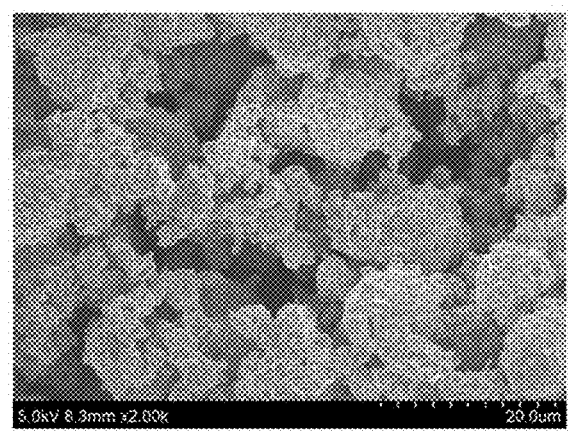
Figure 11:
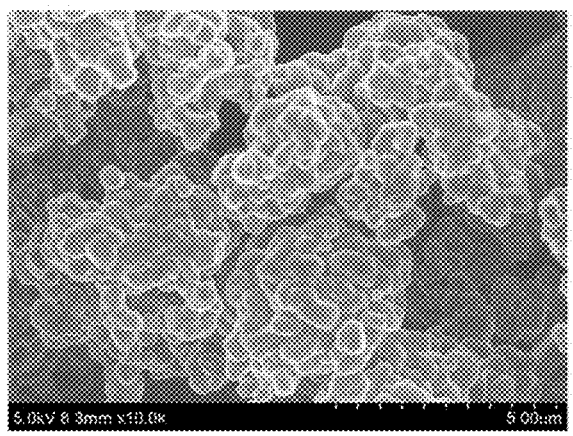

FIGS. 10 and 11 are scanning electron microscope (SEM) pictures of the active materials of Example 1 and Comparative Examples 1 to 3 and 5. The SEM pictures were taken with a general SEM apparatus that is well used in the laboratory. For example, the SEM pictures may be taken using s-4200 of HITACHI. However, there is no deviation according to a measuring apparatus or method.

FIG. 10(*a*) is a SEM picture of a fresh active material of Comparative Example 1, and FIG. 10(*b*) is an enlarged picture of FIG. 10(*a*). FIG. 10(*c*) is a picture of a surface of a positive electrode scrap manufactured with such a fresh active material, and FIG. 10(*d*) is an enlarged picture of FIG. 10(*c*). The fresh active material has no particle breakage, but the positive electrode scrap made of an electrode shows that particles on the surface are pressed and broken by a rolling process.

FIG. 10(*e*) is an SEM picture of Comparative Example 2, and FIG. 10(*f*) is an enlarged picture of FIG. 10(*e*). With reference to FIGS. 10(*e*) and 10(*f*), no binder or conductive material is observed in the recovered active material. That is, it may be confirmed that a binder or a conductive material are removed during a high temperature heat treatment process. Therefore, it may be seen that the active material is separated from a current collector only by heat treatment in the air, and the binder or the conductive material does not almost remain on the surface of the active material.

FIG. 11(*a*) is an SEM picture of Comparative Example 3, and FIG. 11(*b*) is an enlarged picture of FIG. 11(*a*). Upon comparing FIGS. 11(*c*) and 11(*d*) which are pictures of the positive electrode scrap, it may be seen that particles are released through the process.

FIG. 11(*c*) is an SEM picture of Comparative Example 5, and FIG. 11(*d*) is an enlarged picture of FIG. 11(*c*). FIG. 11(*e*) is an SEM picture of Example 1, and FIG. 11(*f*) is an enlarged picture of FIG. 11(*e*). It may be seen that the particles released in the previous step are aggregated through annealing. Upon comparing FIG. 11(*f*) with FIG. 10(*a*), it may be seen that the reuse active material of Example 1 has the same shape as that of the fresh active material.

ICP analysis was performed on the positive active materials recovered from or prepared in the Example 1and Comparative Examples, and an amount of a specific element was also analyzed. The results are shown in Table 3 below.

TABLE 3

|  | Content of B (mg/kg) | Content of W (mg/kg) |
| --- | --- | --- |
| Comparative Example 1 | 500 | 3100 |
| Comparative Example 2 | 200 | 2700 |
| Comparative Example 3 | ND | 200 |
| Comparative Example 5 | ND | 200 |
| Example 1 | ND | 200 |

As shown in Comparative Example 1, the fresh active material used in the present experiment further includes B and W. Comparative Example 2 shows that content of B and W is reduced through heat treatment, and it may be seen from the remaining results that almost B is almost removed in subsequent processes. In the case of W, it may be seen that a large amount of W is removed during the surface modification process through washing as in Comparative Example 3.

Therefore, since according to a type of an initially used active material, a specific element may be lost during the process, and in particular, the specific element may be completely removed or a small amount thereof remains during the surface modification process through washing, there may be a case in which it is difficult to fully recover characteristics by performing only up to the annealing step as in Example 1. In such a case, it is preferable to perform an additional surface coating step as proposed in the present disclosure. The surface coating step is to coat B and W in the case of the present experimental example. Surface coating may act as a surface protective layer of the positive electrode active material. Surface coating may also be a process that supplements a specific insufficient element and at the same time, rebuilds the surface protective layer in the fresh active material. In the case of the fresh active material used in the present experiment, the surface protective layer is made of B—W, and the meaning of loss of lithium during the process is interpreted as a ratio of (lithium of the active material itself+lithium forming the surface protective layer) to other metals, other than the 1:1 ratio of lithium in the active material itself to other metals. Therefore, the molar ratio of 0.09 lost in the above experiment as in Comparative Example 3 may be interpreted as an amount of lithium in which lithium in the positive active material and lithium for forming the surface protective layer are summed, and the lithium precursor capable of supplementing the amount of lithium as much is added in the embodiments.

The surface coating step entails the heat treatment process after the solid or liquid reaction. When the reusable active material is represented by chemical formula 1 mentioned above, it may be considered that M in Chemical Formula 1 is supplemented through this surface coating.

When the surface coating layer includes B, B—W, B—Ti, and B—W—Ti, surface coating heat treatment may be performed at a temperature of 200 to 500° C., and other components may be also coated with a metal component, a carbon component and organic metal components at a temperature within 100 to 1200° C.

As described above, according to the present disclosure, the positive electrode scrap may be reused using a simple, eco-friendly, and economical method, and even if a lithium secondary battery is manufactured by reusing the NCM-based lithium composite transition metal oxide positive electrode active material prepared as described above, there is no problem in the performance of the battery.

Experimental Example 3

Each positive electrode active material was prepared using methods as in Examples and Comparative Examples below, and electrochemical performance thereof was evaluated.

Example 3

Example 3 is the same as Example 1, except that the annealing time was 5 hours shorter than 15 hours in Example 1.

Example 4

Example 4 is the reused active material prepared according to the method described with reference to FIG. 5. After up to step s30 as in Example 1 was performed, steps s40', s45 and s50' were performed. Without drying after washing in step s40', (a washing electrode) was mixed with LiOH powder of 0.1 mol in an aqueous solution (mixed at a ratio of 1:50 of powder to aqueous solution) and granulated with spray drying equipment to perform step s45. Step s50' was performed at 750° C. for 5 hours as in Example 3.

Upon performing step s45, the mixing aqueous solution of the washing electrode and LiOH of 0.1 mol were stirred to prevent electrode precipitation, and adjusted an atmospheric temperature (input temperature) when the spray drying equipment sprays to a heating container using a spray nozzle to be 180° C. and an atmospheric temperature (output temperature) when coming out from the heating container to a collection container to maintain 100° C. or more.

Figure 12:
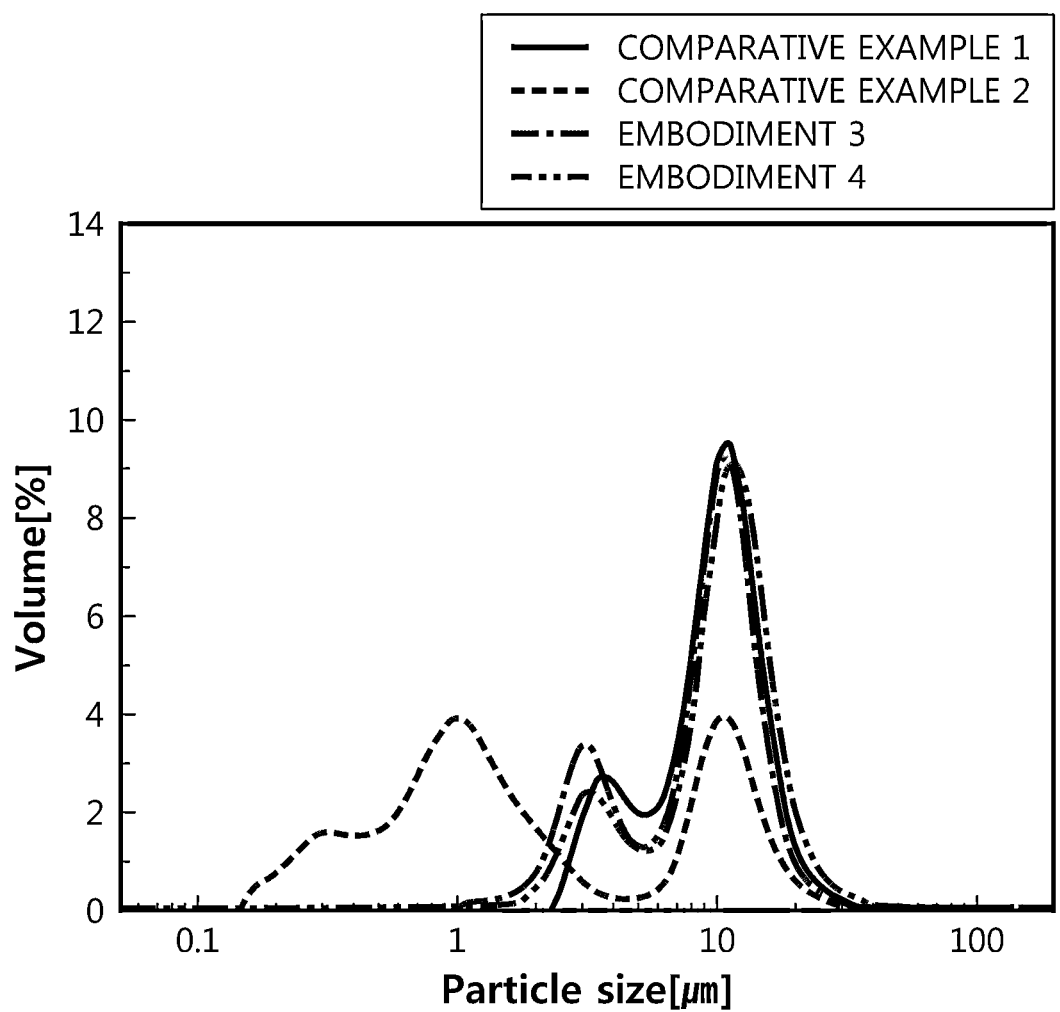
FIG. 12 is a particle size distribution graph of active materials of Examples 3 and 4 and Comparative Examples 1 and 2.

FIG. 12 is a particle size distribution graph of the active materials of Examples 3 and 4 and Comparative Examples 1 and 2. The particle size distribution may be obtained by a general particle size analyzer well used in the laboratory. For example, the particle size distribution may be measured using a Horiba LA 950V2 particle size analyzer. However, there is no deviation according to a measuring apparatus or method. In FIG. 12, the horizontal axis represents particle size (μm) and the vertical axis represents volume %.

In the case of Comparative Example 2, the active materials of Comparative Example 1 were split into particles of sub-micron size (less than 1 micrometer) and micronized by pressure in the electrode process. As such, Comparative Example 2 has a very different particle size distribution from that of Comparative Example 1.

Since in Example 3 and Example 4, up to annealing was performed, during annealing, the previously added lithium precursor melted and agglomeration of particles was induced, and thus it may be seen that many of the micronized particles shown in Comparative Example 2 disappeared. In particular, in the case of Example 4 according to the present disclosure, compared to Example 3, small particles decrease and large particles slightly increase, but there is no significant difference in the particle size distribution. Example 4 may be regarded to be more similar to the particle size distribution of Comparative Example 1 compared to Example 3 from the fact that small-sized particles are fewer.

As such, it was confirmed that upon using spray drying proposed in another embodiment of the present disclosure (Example 4), the particle size distribution is more similar to that of the fresh active material (Comparative Example 1) compared to the case of mixing the lithium precursor in a solid phase (Example 3), and in particular, there is an advantage that a continuous process with the washing step before spray drying is possible.

Figure 13:
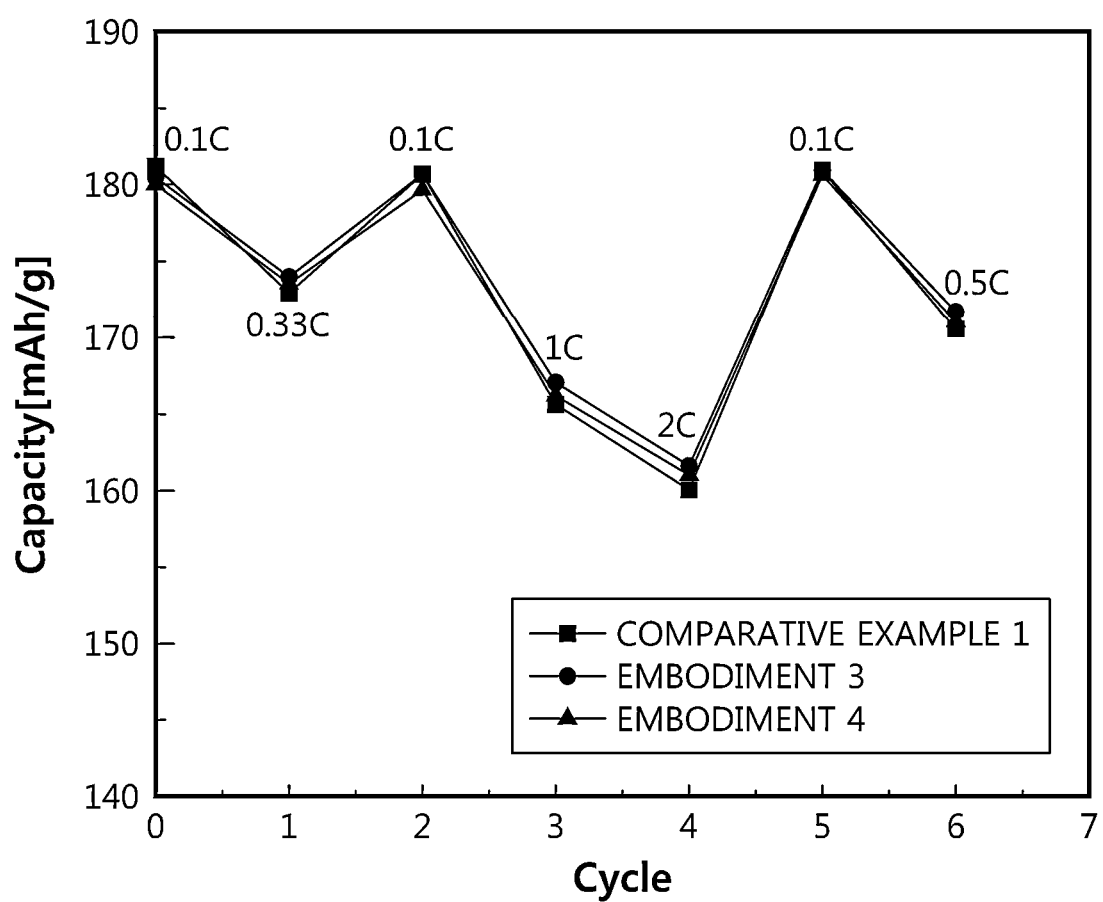
FIG. 13 shows results of cell evaluation using the active materials of Examples 3 and 4 and Comparative Example 1, and resultant values are summarized in Table 4.

FIG. 13 shows results of cell evaluation using the active materials of Examples 3 and 4 and Comparative Example 1, and resultant values are summarized in Table 4.

TABLE 4

| Cycle | Charging/ Discharging | Comparative Example 1 (mAh/g) | Example 3 (mAh/g) | Example 4 (mAh/g) |
|---|---|---|---|---|
| 0 (Formation) | 0.1 C/0.1 C | 181.093 | 180.534 | 180.062 |
| 3 | 0.5 C/1 C | 165.893 | 166.872 | 166.259 |
| 4 | 0.5 C/2 C | 160.138 | 161.568 | 161.189 |

Referring to FIG. 13 and Table 4, both the electrodes using Example 3 and Example 4 showed similar results to the electrode using Comparative Example 1. The initial formation capacity is high in Comparative Example 1 and the c-rate capacity is slightly higher in Example 3 and Example 4, but it is determined that they are similar to each other. As described above, according to the embodiments of the present disclosure, the reuse active material similar to the fresh active material (Comparative Example 1) may be obtained.

Experimental Example 4

Each positive electrode active material was further prepared using methods as in Examples and Comparative Examples below, and electrochemical performance thereof was evaluated.

Example 5

A reuse active material was collected according to another active material reuse method of the present disclosure as described above. An LCO positive electrode scrap to be discarded after punching a positive electrode plate was prepared and heat treatment of step s30 was performed at 600° C. in the air for 30 minutes at a temperature rise rate of 5° C./min. Step s50 was performed without washing of step s40 or s40'. The lithium precursor ($Li_2CO_3$) of an excess amount of 2 mol % of lithium compared to an amount of lithium of the reuse LCO was put in and annealed at 750° C. in the air for 15 hours.

Comparative Example 6

The fresh LCO was used other than the reuse active material.

Comparative Example 7

In the active material reuse method of the present disclosure as described above, only heat treatment of step s30 was performed to remove the binder, the conductive material, and the Al current collector, and the LCO active material was collected. Step s30 was performed under the same conditions as in Example 5.

Comparative Example 8

The LCO active material was collected in the same manner as in Comparative Example 7, except that the heat treatment time was 1 hour.

Comparative Example 9

The LCO active material was collected in the same manner as in Comparative Example 8, except that the heat treatment time was 5 hours.

Figure 14:
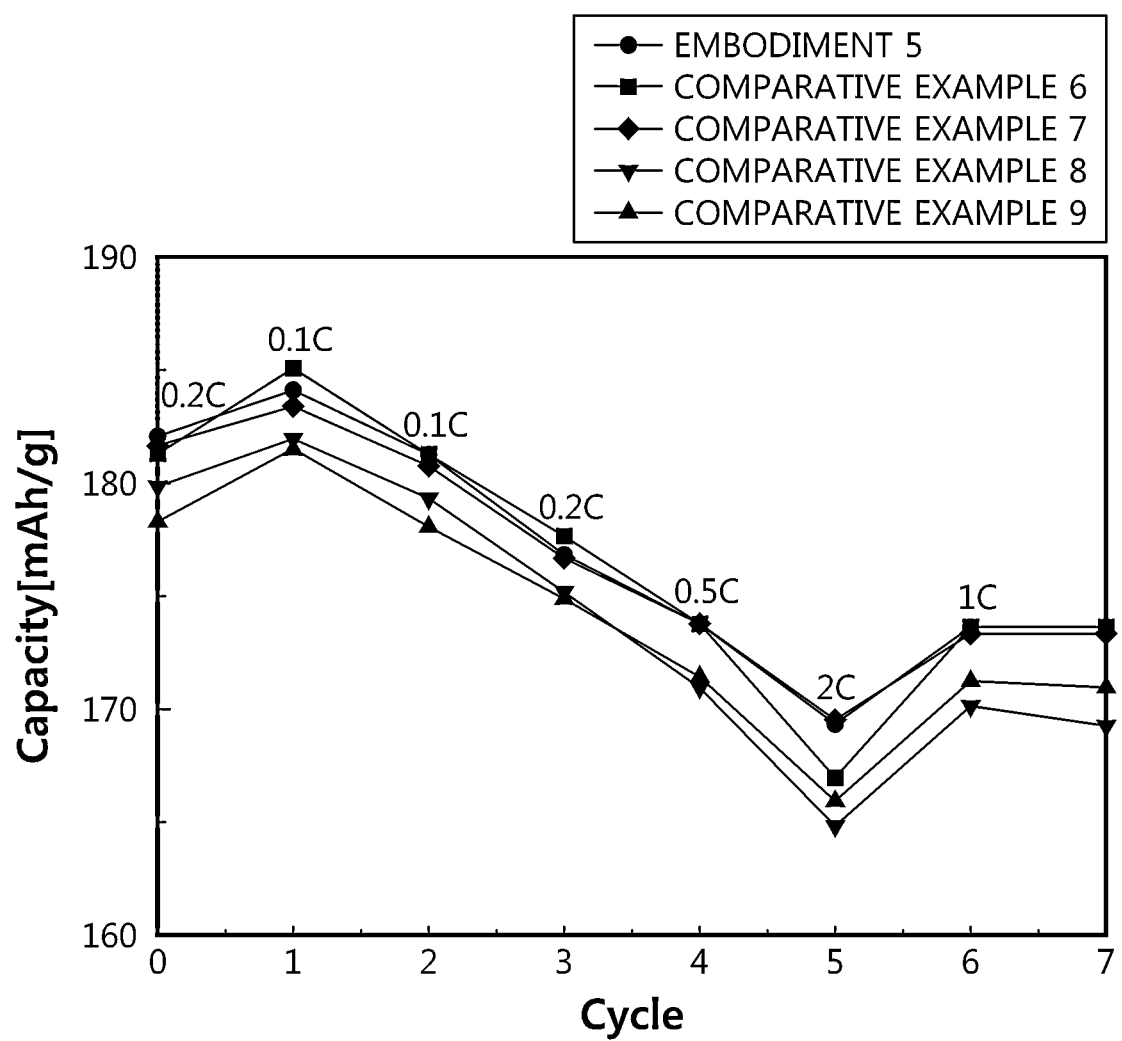
FIG. 14 shows results of cell evaluation using the active materials of Example 5 and Comparative Examples 6 to 9.

FIG. 14 shows results of cell evaluation using the active materials of Example 5 and Comparative Examples 6 to 9.

Referring to FIG. 14, the lowest rate performance may be confirmed in Comparative Example 9 in which the heat treatment time is the longest as 5 hours. This is because, when the high temperature heat treatment process such as step s30 is performed for a long time, the binder and the conductive material are removed as $CO_2$ and $H_2O$, react with lithium on the surface of the positive electrode active material to form $Li_2CO_3$, react with F present in the binder to form LiF. Furthermore, it is determined to exhibit low battery properties due to $Co_3O_4$ generated on the LCO surface by thermal decomposition.

In Comparative Example 8, it may be seen that since the heat treatment time was 1 hour which is shorter than Comparative Example 9, the rate performance was better than that of Comparative Example 9 until about the initial cycle 3, but as the number of cycles increased, the rate performance deteriorated.

In Comparative Example 7, the heat treatment time was 30 minutes which is shorter than Comparative Examples 8 and 9. In the case of Comparative Example 7, the rate performance is superior to those of Comparative Examples 8 and 9. Therefore, it may be confirmed that the heat treatment time is preferably within 30 minutes in terms of the rate performance because the generation of reaction products such as LiF is minimized.

In Example 5, compared to Comparative Example 7, up to annealing was performed by adding the lithium precursor, during which $Li_2CO_3$ was added to supplement lithium lost in the process of recovering the active material and to restore crystallinity. According to Example 5, it is possible not only to supplement an insufficient amount of lithium occurred during the process, but also to reduce a deformed structure and $Co_3O_4$ that may appear on the surface of the active material during regeneration to the LCO crystal structure again, and thus it is confirmed that Example 5 exhibits results improved compared to the initial characteristics of the fresh LCO active material of Comparative Example 6. As described above, according to the present disclosure, the active material may be recovered from the positive electrode scrap so as to be directly reused.

Figure 15:
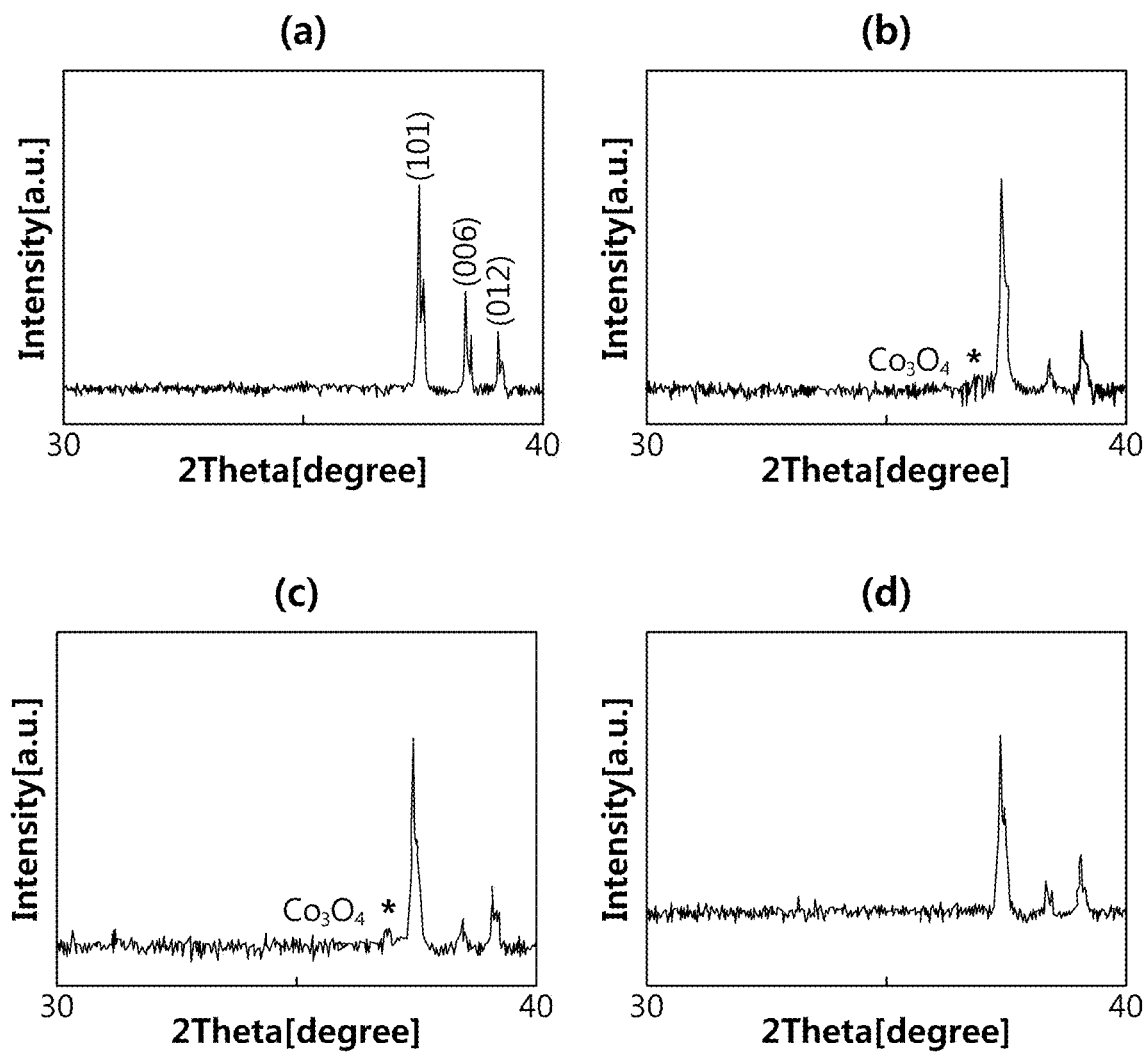
FIG. 15 shows XRD patterns of active materials of Example 5 and Comparative Examples 6, 7, and 9.

FIG. 15 shows XRD patterns of active materials of Example 5 and Comparative Examples 6, 7, and 9. In the XRD pattern, the horizontal axis represents 2θ (Theta) (degrees), and the vertical axis represents intensity. The XRD pattern has been obtained using a general X-ray diffraction apparatus that is well used in the laboratory. For example, the XRD pattern may be analyzed using an X-ray diffractometer XG-2100 manufactured by Rigaku. However, there is no deviation according to an apparatus or the method.

FIG. 15(a) is an XRD pattern of Comparative Example 6, that is, the XRD pattern of fresh LCO. FIG. 15(b) is an XRD pattern of the active material of Comparative Example 7, and FIG. 15(c) is an XRD pattern of the active material of Comparative Example 9. Upon comparing FIGS. 15(b) and 15(c) with FIG. 15(a), the $Co_3O_4$ phase is checked. That is, it may be confirmed that $Co_3O_4$ is generated on the surface of LCO during heat treatment of step s30.

FIG. 15(d) is an XRD pattern of the active material of Example 5. Upon comparing FIGS. 15(b) and 15(c) with FIG. 15(d), it may be seen that the $Co_3O_4$ phase disappears and the crystal structure is restored to LCO through annealing of step s50. In view of the location of a diffraction peak in the XRD pattern, the crystal structure of FIG. 15(d) is similar to the crystal structure of FIG. 15(a). Therefore, it may be confirmed that the embodiment of the present disclosure is restored to the level of the fresh active material of Comparative Example 6. As described above, according to the present disclosure, $Co_3O_4$ generated during the heat treatment process may be removed during the annealing process, and the active material may be recovered from the positive electrode scrap so as to be directly reused.

Figure 16:
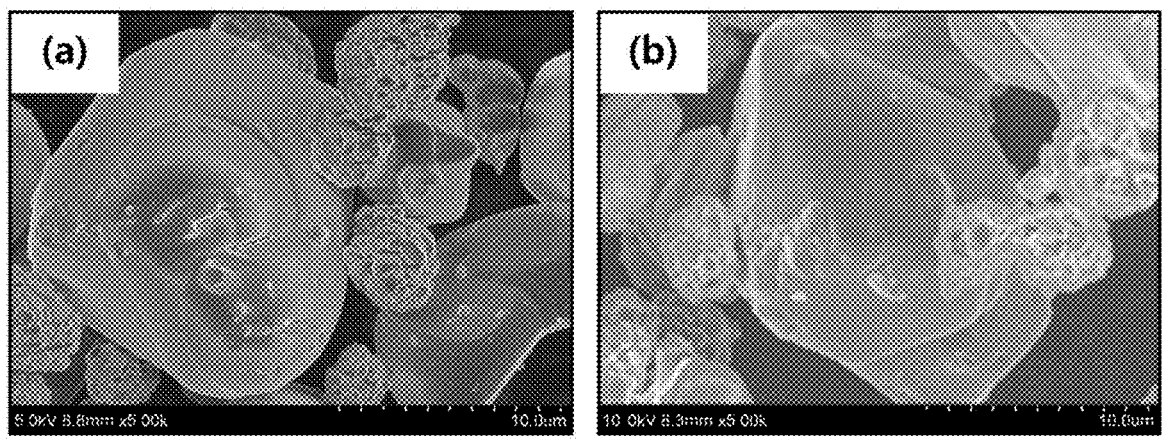
FIG. 16 is SEM pictures of the active materials of Example 5 and Comparative Example 6.

FIG. 16 is SEM pictures of the active materials of Example 5 and Comparative Example 6.

FIG. 16(a) is a SEM picture of the fresh LCO of Comparative Example 6, and FIG. 16(b) is a SEM picture of the reuse active material of Example 5. It may be confirmed that the recovered LCO of Example 5 also exhibits the same shape as compared with the fresh LCO. Furthermore, since only LCO is observed, it is confirmed that the binder and the conductive material were removed during the high temperature heat treatment process. Therefore, it may be seen that the active material is separated from the current collector only by heat treatment in the air, and almost no binder or conductive material remains on the surface of the active material. As described above, according to the present disclosure, it is possible to separate the active material from the current collector without using a complicated method or harmful substances, and thus the active material may be recovered in an eco-friendly manner. The active material may be reused without using an acid, and thus a neutralization process or a wastewater treatment process is not required, thereby relaxing environmental issues and reducing process costs.

Figure 17:
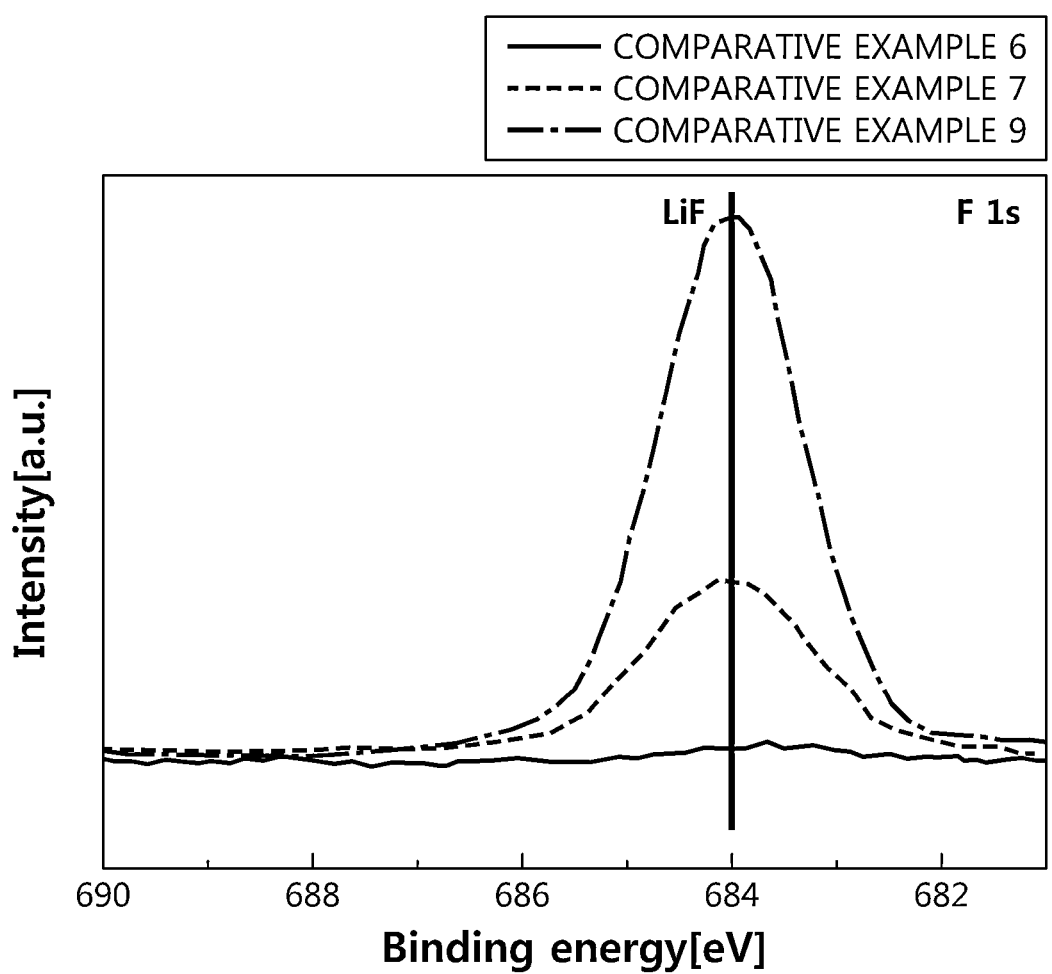
FIG. 17 shows X-Ray Photoelectron Spectroscopy (XPS) patterns of active materials of Comparative Examples 6, 7, and 9.

FIG. 17 shows X-Ray Photoelectron Spectroscopy (XPS) patterns of active materials of Comparative Examples 6, 7, and 9. In the XPS patterns, the horizontal axis represents the binding energy (unit: eV). The XPS patterns may be obtained using a general XPS measuring apparatus that is well used in the laboratory. For example, the XPS patterns may be analyzed using K-Alpha from Thermo Fisher Scientific. As mentioned above, F present in the binder may react with Li of the active material during the heat treatment process to form LiF.

In FIG. 17, a peak near 684 eV appears by LiF, and the higher the intensity according to the sample, the greater the amount of LiF is present on the surface of the positive electrode active material. Since the XPS pattern of Comparative Example 6 was measured using fresh LCO, the presence of LiF was not measured. In Comparative Example 9, a great amount of LiF was generated on the surface of the active material due to heat treatment for a long time of 5 hours. As a result, the LiF peak intensity of XPS was measured to be significantly higher than that of Comparative Example 6. However, in the case of Comparative Example 7 in which the heat treatment time is reduced from 5 hours to 30 minutes, it may be seen that the formation of F due to binder decomposition is relatively reduced, and the amount of LiF present on the surface of the active material is relatively reduced. LiF should be as small as possible because it may cause deterioration of electrode properties. From the results of Comparative Example 9 and Comparative Example 7, it may be seen that a decrease in the heat treatment time may reduce the amount of LiF on the surface of the regenerated active material and is effective in improving the performance of the regenerated active material. Example 5 will have LiF of a level similar to that of Comparative Example 7, but as shown in the results of FIG. 14 above, LiF of a level higher than that of the fresh active material may be secured after annealing, and thus it may be seen that the amount of LiF remaining in Example 5 is not so much a problem for battery performance Therefore, if the heat treatment time is optimized as in another embodiment of the present disclosure, a separate process such as washing for removing LiF, etc. is not required.

Figure 18:
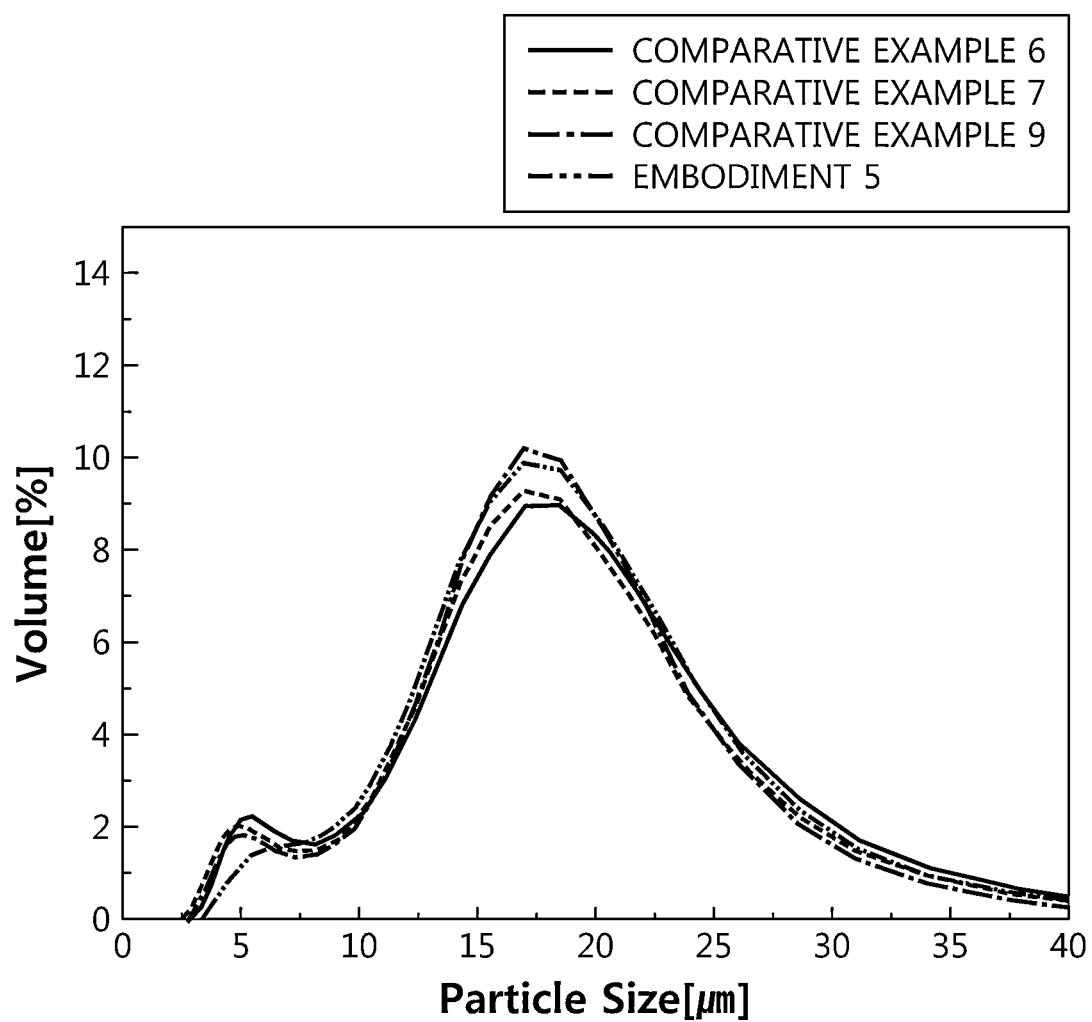
FIG. 18 is a particle size distribution graph of the active materials of Example 5 and Comparative Examples 6, 7, and 9.

FIG. 18 is a particle size distribution graph of the active materials of Example 5 and Comparative Examples 6, 7, and 9. All the active materials recovered in Example 5 and Comparative Examples 6, 7, and 9 have a similar particle size distribution compared to the fresh LCO of Comparative Example 6. It is defined that when the volume % of particles having the same particle size differs only in the range within ±2%, the particle size distribution is similar. As described above, according to the present disclosure, since the particle size distribution of the active material does not differ, the initial characteristics are almost maintained, and it is expected that properties of a battery reusing the active material will be similar to properties of a battery using the fresh active material.

Experimental Example 5

Each positive electrode active material was prepared using methods as in Example and Comparative Examples below, and electrochemical performance thereof was evaluated.

Example 6

A reuse active material was collected according to another active material reuse method of the present disclosure as described above. A positive electrode scrap to be discarded after punching a positive electrode plate was prepared and heat treatment of step s30 was performed at 600° C. for 30 minutes. Washing of step s40 was performed for 10 minutes using LiOH. Annealing was performed at 750° C. for 15 hours without adding an additional lithium precursor as in step s50'.

Comparative Example 10

In addition to Comparative Example 7, an LCO active material was recovered by performing surface modification of step s40 in the active material reuse method of the present disclosure as described above. That is, crystal structure recovery of step s50 or s50' was not performed in the active material reuse method of the present disclosure while performing surface modification. Step s40 was performed under the same conditions as in Example 6.

To know an amount of LiF remaining in the active material recovered in Example 6 and Comparative Example 7, F was detected and analyzed by ICP. The results are shown in Table 5 below.

TABLE 5

|  | Comparative Example 7 | Example 6 |
|---|---|---|
| Content of F (mg/kg) | 1900 | ND |

Referring to Table 5 above, it may be seen that the content of F in the recovered positive active material was significantly reduced in Example 6 as compared to Comparative Example 7. That is, it may be confirmed that LiF is completely dissolved in a lithium compound aqueous solution by washing and removed to the extent that LiF may not be detected by ICP. Therefore, it may be seen that removal of LiF is excellent by step s40.

ICP analysis was performed on the positive active materials recovered from or prepared in the Example and Comparative Examples, and an amount of a specific element was also analyzed. The results are shown in Table 6 below.

TABLE 6

|  | Content of Al (wt %) |
|---|---|
| Comparative Example 6 | 0.33 |
| Comparative Example 7 | 0.33 |
| Comparative Example 10 | 0.33 |
| Example 6 | 0.33 |

As shown in Comparative Example 6, the fresh active material used in the present experiment further includes Al. Comparative Example 7 shows that the content of Al is not changed even through heat treatment, and it may be seen from the content of Al is maintained even Comparative Example 10 and Example 6 that further include subsequent processes. As described above, according to the present disclosure, it may be seen that LiF or metal fluoride without may be removed without loss of other elements such as Al, and elution of transition metals, etc. may be prevented.

Figure 19:
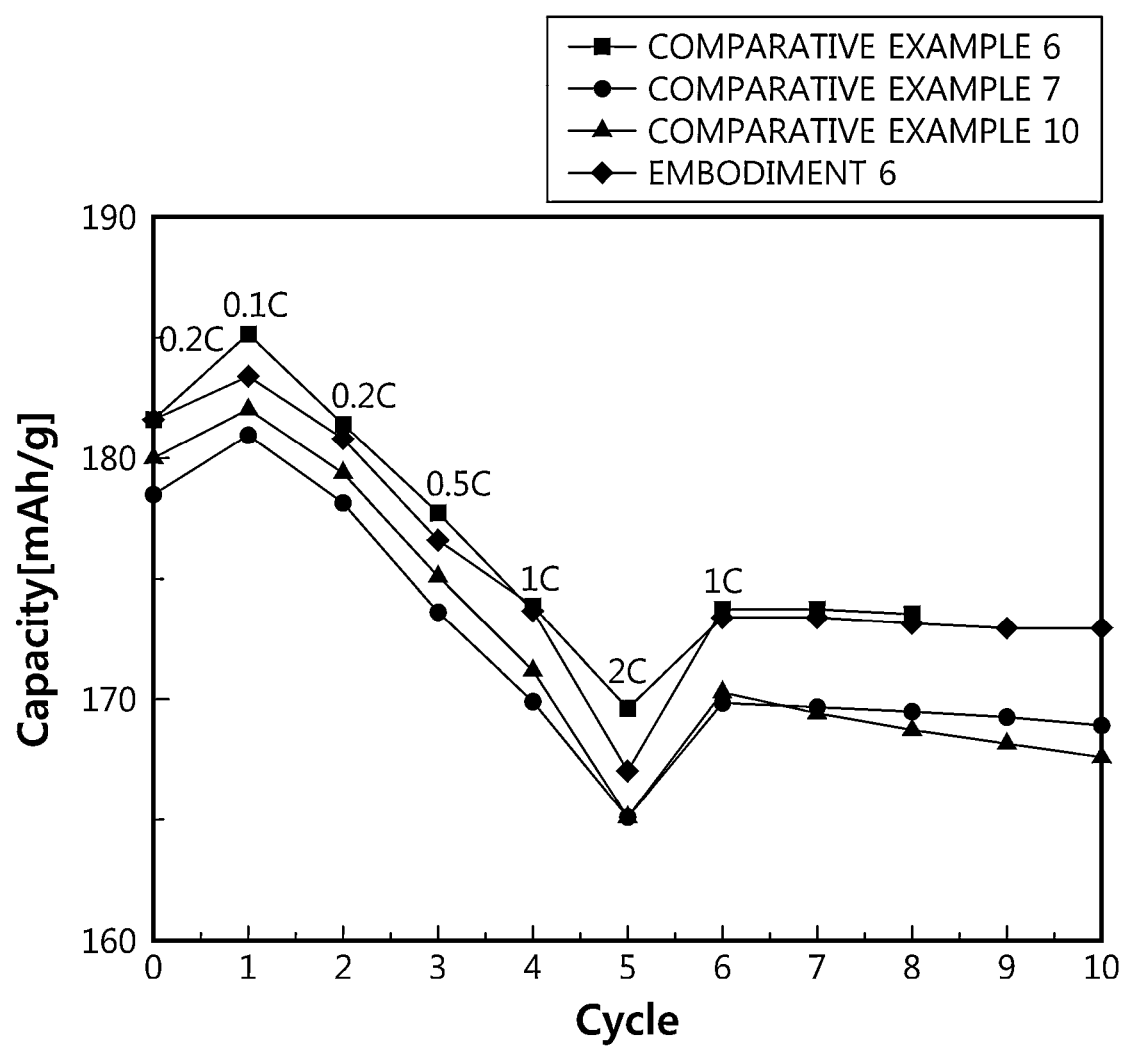
FIG. 19 shows results of cell evaluation using active materials of Example 6 and Comparative Examples 6, 7, and 10.

FIG. 19 shows results of cell evaluation using active materials of Example 6 and Comparative Examples 6, 7, and 10.

Referring to FIG. 19, the lowest rate performance may be confirmed in Comparative Example 7 in which surface modification and crystal structure recovery according to the present disclosure were not performed in spite of the reuse active material. This is because, during the high temperature heat treatment process such as step s30, not only the binder and the conductive material are removed as $CO_2$ and $H_2O$ and react with lithium on the surface of the positive electrode active material to form $Li_2CO_3$ and LiOH but also react with F present in the binder to form LiF or metal fluoride on the surface of the reuse active material. Furthermore, it is determined to exhibit low battery properties due to $Co_3O_4$ generated on the LCO surface by thermal decomposition.

In Comparative Example 10, surface modification was performed compared to Comparative Example 7. Comparative Example 10 is evaluated to have been able to obtain better results than Comparative Example 7 because reactants generated on the surface were removed through washing.

In Example 6, compared to Comparative Example 10, up to annealing was performed. A deformed structure and $Co_3O_4$ that may appear on the surface of the active material during regeneration are reduced to the LCO crystal structure again, and thus it is confirmed that Example 6 exhibits results improved compared to the initial characteristics of the fresh LCO active material of Comparative Example 6. As described above, according to the present disclosure, the active material may be recovered from the positive electrode scrap so as to be directly reused.

Figure 20:
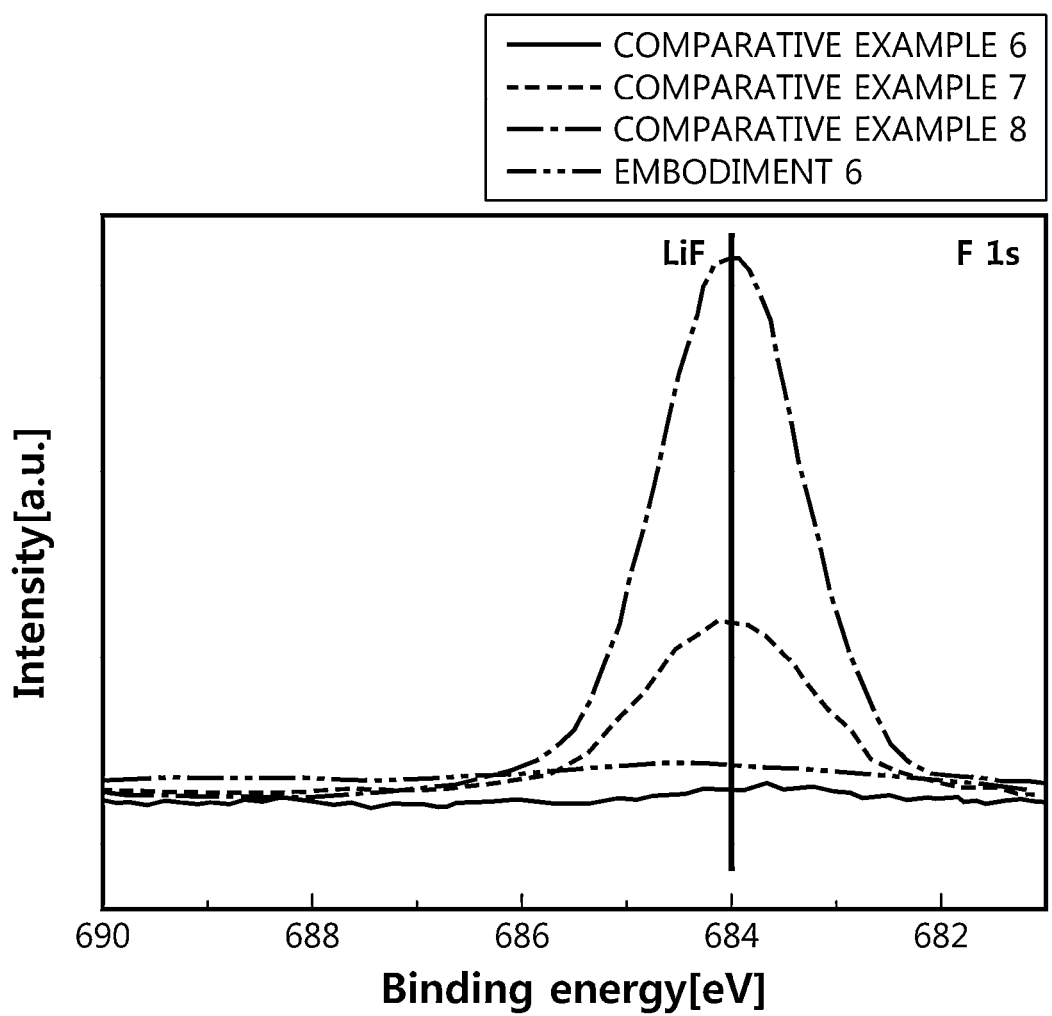
FIG. 20 shows XPS patterns of the active materials of Example 6 and Comparative Examples 6 to 8.

FIG. 20 shows XPS patterns of the active materials of Example 6 and Comparative Examples 6 to 8. Since the XPS pattern of Comparative Example 6 was measured using fresh LCO, the presence of LiF was not measured. However, in Comparative Example 7, the presence of LiF formed on the surface of the active material during the heat treatment process may be confirmed. In Comparative Example 8, since the heat treatment time was increased to 5 hours, the generation of F was increased compared to Comparative Example 7, and since the amount of LiF generated on the surface of the active material was increased, the LiF peak intensity of XPS was measured higher than that of Comparative Example 7. Since the amount of LiF present on the surface of the active material causes deterioration of electrode properties, it is necessary to remove LiF. In Example 6, compared to Comparative Example 7, LiF was removed through washing, and it may be confirmed that the peak of LiF does not appear even in the XPS results.

Through the XPS analysis described above, it may be confirmed that the results of Example 6 are similar to the results of Comparative Example 6. Therefore, it may be confirmed that Example 6 of the present disclosure is restored to the level of the fresh active material of Comparative Example 6. As described above, according to the present disclosure, when the washing time is shortened, the active material may be recovered from the positive electrode scrap so as to be directly reused even without addition of a lithium precursor.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. An active material recovery apparatus which is a rotary firing apparatus having a rod of a screw type therein, the active material recovery apparatus comprising:
   a heat treatment bath and a screening wall arranged in a line along an axis of the rod, wherein the heat treatment bath constitutes a heating zone, and the screening wall constitutes a cooling zone; and
   an exhaust injection and degassing system,
   wherein the heat treatment bath is configured to removes a binder and a conductive material from an active material layer by performing heat treatment in air on an electrode scrap comprising the active material layer on a current collector while rotating the electrode scrap around the axis of the rod, and separate the current collector from the active material layer, and
   wherein an active material in the active material layer passes through the screening wall and is recovered as the active material in powder form, and the current collector that does not pass through the screening wall is recovered separately.

2. The active material recovery apparatus of claim 1, wherein the heat treatment bath also rotates around the axis of the rod.

3. The active material recovery apparatus of claim 1, wherein an angle of the entire active material recovery apparatus is adjusted so that the axis of the rod is inclined with respect to a ground.

4. The active material recovery apparatus of claim 1, wherein the active material recovery apparatus has a vibration function.

5. The active material recovery apparatus of claim 1, wherein the active material recovery apparatus is a continuous type so that input of a new electrode scrap and recovery of the active material are continuously performed.

6. The active material recovery apparatus of claim 1, wherein the heat treatment bath has a tubular shape with both ends open so that the electrode scrap is put therein and the separated current collector and active material are transferred to the screening wall, and the heat treatment bath is an open type system through which air enters and exits.

7. The active material recovery apparatus of claim 6, wherein the screening wall has a tubular shape with both ends open so that the separated current collector and active material are put therein and the current collector is discharged.

8. The active material recovery apparatus of claim 1, wherein the heat treatment bath is an open type system in which air of 10 mL/min to 100 L/min is added or injected per 100 g of the electrode scrap that is put in.

9. The active material recovery apparatus of claim 1, wherein air inlets are formed in a plurality of places in the heat treatment bath.

10. A method of reusing a positive electrode active material, comprising:
    providing the active material recovery apparatus according to claim 1;
    feeding a positive electrode scrap into a heat treatment bath, the positive electrode scrap comprising an active material layer on a current collector;
    removing a binder and a conductive material from the active material layer by performing heat treatment in air on the positive electrode scrap while rotating the positive electrode scrap around an axis of a rod in the heat treatment bath, and separating the current collector from the active material layer;
    recovering an active material in powder form that has passed through the screening wall; and
    annealing the active material in air at 400 to 1000° C. to obtain a reusable active material.

11. The method of claim 10, wherein the heat treatment is performed at 300 to 650° C.

12. The method of claim 10, further comprising, before the annealing step, washing the recovered active material with a lithium compound solution showing basicity in an aqueous solution state.

13. The method of claim 12, wherein, before the annealing step and after the washing step, a lithium precursor is added to the active material.

14. The method of claim 12, further comprising, after the washing step, obtaining the active material to which a lithium precursor is added and of which particles are adjusted, by mixing the washed active material with a lithium precursor solution and spray drying the active material.

15. The method of claim 10, further comprising performing surface coating on the active material after the annealing step.

* * * * *